United States Patent
Kravchenko et al.

(10) Patent No.: US 11,719,662 B2
(45) Date of Patent: Aug. 8, 2023

(54) MOISTURE SENSOR

(71) Applicant: Infineon Technologies AG, Neubiberg (DE)

(72) Inventors: Andrey Kravchenko, Dresden (DE); Heiko Froehlich, Radebeul (DE); Magali Glemet, Dresden (DE); Vladislav Komenko, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/817,138

(22) Filed: Aug. 3, 2022

(65) Prior Publication Data

US 2022/0373494 A1 Nov. 24, 2022

Related U.S. Application Data

(62) Division of application No. 16/540,669, filed on Aug. 14, 2019, now Pat. No. 11,486,848.

(30) Foreign Application Priority Data

Sep. 4, 2018 (DE) .......................... 102018215018.4

(51) Int. Cl.
*G01N 27/22* (2006.01)
(52) U.S. Cl.
CPC ................................. *G01N 27/225* (2013.01)
(58) Field of Classification Search
CPC .... G01N 27/22; G01N 27/221; G01N 27/223; G01N 27/225; G01N 27/226; G01N 27/227; G01N 27/228
See application file for complete search history.

(56) References Cited

U.S. PATENT DOCUMENTS

| | | | | | |
|---|---|---|---|---|---|
| 4,164,868 | A | * | 8/1979 | Suntola | G01N 27/225 73/335.04 |
| 4,429,343 | A | * | 1/1984 | Freud | G01N 27/225 73/335.04 |
| 4,564,882 | A | * | 1/1986 | Baxter | G01N 27/225 73/335.04 |

(Continued)

FOREIGN PATENT DOCUMENTS

| | | |
|---|---|---|
| DE | 102006019534 A1 | 11/2007 |
| EP | 1607739 A1 | 12/2005 |
| WO | 2014030129 A1 | 2/2014 |

*Primary Examiner* — Steven L Yeninas
(74) *Attorney, Agent, or Firm* — Slater Matsil, LLP

(57) ABSTRACT

A moisture sensor comprises a carrier element comprises an insulating material, a first and a second electrode structure at a distance from one another at the carrier element, a moisture-sensitive, dielectric layer element at a first main surface region of the carrier element and adjacent to the first and second electrode structures and a third electrode structure on a first main surface region of the moisture-sensitive, dielectric layer element, such that the moisture-sensitive, dielectric layer element is between the third electrode structure and the first electrode structure and between the third electrode structure and the second electrode structure. The first electrode structure is a first capacitor electrode and the second electrode structure is a second capacitor electrode of a measurement capacitor for capacitive moisture measurement, wherein the third electrode structure is a floating electrode structure.

18 Claims, 13 Drawing Sheets

(56) References Cited

U.S. PATENT DOCUMENTS

| | | | | |
|---|---|---|---|---|
| 4,639,831 | A * | 1/1987 | Iyoda | B60S 1/0818 |
| | | | | 324/689 |
| 6,222,376 | B1 * | 4/2001 | Tenney, III | G01N 27/225 |
| | | | | 324/663 |
| 8,852,983 | B1 | 10/2014 | Fedder et al. | |
| 2004/0155751 | A1 | 8/2004 | Benzel et al. | |
| 2006/0096371 | A1 * | 5/2006 | Isogai | G01N 27/223 |
| | | | | 29/595 |
| 2011/0179861 | A1 * | 7/2011 | Grange | G01N 27/225 |
| | | | | 977/773 |
| 2013/0139587 | A1 | 6/2013 | Le Neel et al. | |
| 2015/0153297 | A1 | 6/2015 | Aliane et al. | |
| 2016/0077028 | A1 | 3/2016 | Beck et al. | |
| 2019/0391103 | A1 * | 12/2019 | Durupt | G01N 27/223 |

* cited by examiner

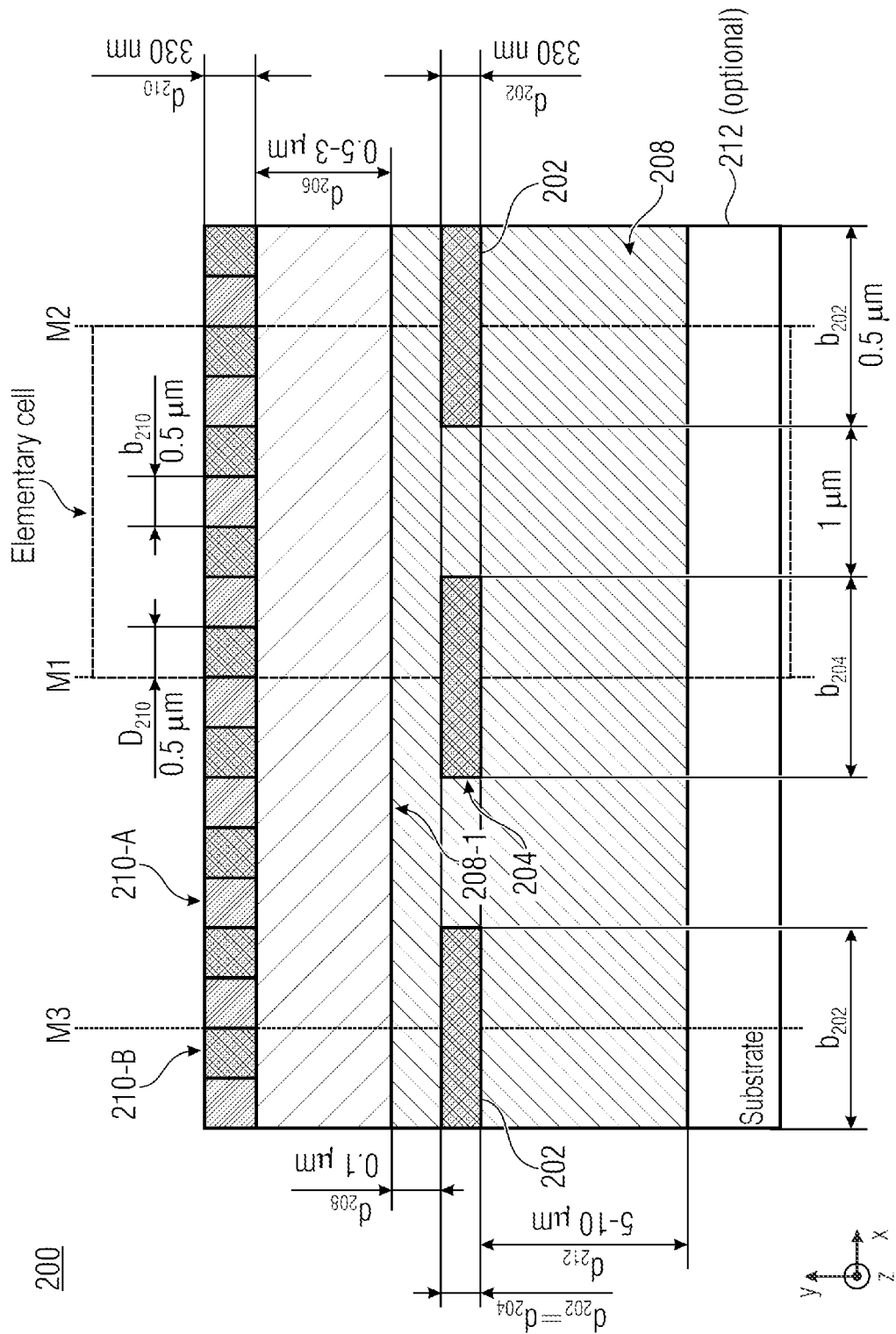

MOISTURE SENSOR

This application is a divisional of U.S. patent application Ser. No. 16/540,669, filed Aug. 14, 2019, which application claims the benefit of German Application No. 102018215018.4, filed on Sep. 4, 2018, which applications are hereby incorporated herein by reference.

TECHNICAL FIELD

Exemplary embodiments relate to a moisture sensor and to a method for producing same. In particular, exemplary embodiments relate to a vertical leakage field moisture sensor or a concept for detecting moisture by a vertical component of the electrical leakage field.

BACKGROUND

The detection of environmental or ambient parameters in the surrounding atmosphere is becoming more and more important in the implementation of a corresponding sensor system within mobile devices, but also in the application in home automation, such as e.g., Smart Home, and for example also in the automotive sector. As the use of sensors becomes more and more comprehensive, however, there is in particular also a need to be able to produce such sensors with as little complexity as possible and thus as cost-effectively as possible, but the resulting reliability and accuracy of the sensors ought nevertheless to be maintained.

SUMMARY

There is thus a need for a concept for reliable moisture sensors which, on the one hand, detect the moisture or air humidity in the surrounding atmosphere as reliably and accurately as possible and, on the other hand, can also be integrated into existing semiconductor processing processes with as little complexity as possible.

Such a need can be met by the subject matter of the independent patent claims. Developments of the present concept are defined in the dependent claims.

In accordance with one exemplary embodiment, a moisture sensor 100 comprises a first and a second electrode structure 102, 104, a moisture-sensitive, dielectric layer element 106, and an insulation structure 108 having a cutout 110 having a sidewall region 110-1 and a bottom region 110-2. The moisture-sensitive, dielectric layer element 106 is arranged in the cutout 110 and at least partly fills the latter, wherein the first electrode structure 102 is arranged adjacent to the wall region 110-1 of the cutout 110 at least partly in the insulation structure 108, wherein the second electrode structure 104 is arranged adjacent to the bottom region 110-2 of the cutout 110 at least partly in the insulation structure 108, and wherein the first electrode structure 102 is configured as a first common capacitor electrode and the second electrode structure 104 is configured as a second common capacitor electrode of a measurement capacitor 102, 104 for capacitive moisture measurement.

In accordance with one exemplary embodiment, the moisture-sensitive, dielectric layer element 106 is configured to be effective at least regionally as a capacitor dielectric of the measurement capacitor between the first and second capacitor electrodes 102, 104.

In accordance with one exemplary embodiment, a moisture sensor 200 comprises a carrier element 208 comprising an insulating material, a first and a second electrode structure 202, 204 arranged at a distance from one another at the carrier element 208, a moisture-sensitive, dielectric layer element 206 at a first main surface region 208-1 of the carrier element 208 and adjacent to the first and second electrode structures 202, 204, and a third electrode structure 210 on a first main surface region 206-1 of the moisture-sensitive, dielectric layer element 206, such that the moisture-sensitive, dielectric layer element 206 is arranged between the third electrode structure 210 and the first electrode structure 202 and between the third electrode structure 210 and the second electrode structure 204. In this case, the first electrode structure 202 is configured as a first capacitor electrode and the second electrode structure 204 is configured as a second capacitor electrode of a measurement capacitor 202, 204 for capacitive moisture measurement, wherein the third electrode structure 210 is configured as a floating electrode structure.

In accordance with one exemplary embodiment the moisture-sensitive, dielectric layer element 206 is configured to be effective at least regionally as a capacitor dielectric of the measurement capacitor.

In accordance with one exemplary embodiment the floating electrode structure 210 comprises a conductive layer having openings 210-A, such that the moisture-sensitive, dielectric layer element 206 is accessible to the surrounding atmosphere through the openings 210-A.

BRIEF DESCRIPTION OF THE DRAWINGS

Preferred exemplary embodiments of the present concept of a moisture sensor are explained in greater detail below with reference to the accompanying drawings, in which:

FIGS. 5a, 5c show basic schematic cross-sectional illustrations of a moisture sensor in accordance with a further exemplary embodiment;

DETAILED DESCRIPTION OF ILLUSTRATIVE EMBODIMENTS

Figure 1A:
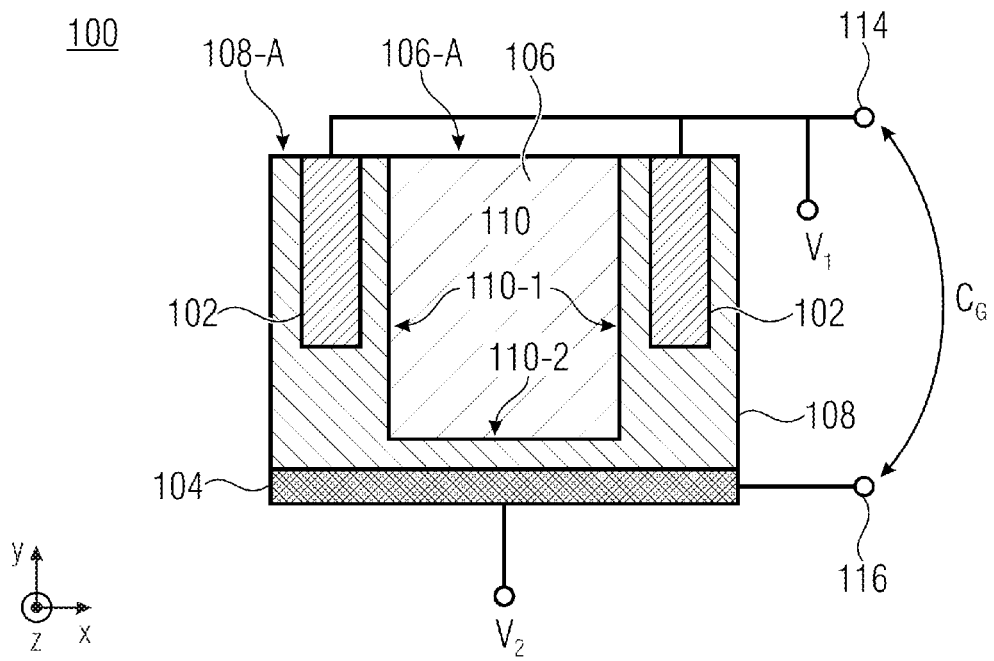
FIGS. 1a-1c show basic schematic cross-sectional illustrations of a (vertical) moisture sensor in accordance with one exemplary embodiment.

Before exemplary embodiments of the present concept are explained more specifically in detail below with reference to the drawings, it is pointed out that identical, functionally identical or identically acting elements, objects, function blocks and/or method steps are provided with the same reference signs in the various figures, such that the description of said elements, objects, function blocks and/or method steps that is presented in various exemplary embodiments is mutually interchangeable or can be applied to one another.

Various exemplary embodiments will now be described more thoroughly with reference to the accompanying drawings illustrating some exemplary embodiments. In the figures, dimensions of layers and/or regions may be illustrated in a manner not to scale for elucidation purposes.

It goes without saying that if one element is designated as "connected" or "coupled" to another element, it can be connected or coupled directly to the other element or intermediate elements can be present. If, in contrast, one element is designated as "connected" or "coupled" "directly" to another element, no intermediate elements are present. Other expressions used for describing the relationship between elements should be interpreted in a similar way (e.g., "between" vis-à-vis "directly between", "adjacent" vis-à-vis "directly adjacent", etc.).

In order to simplify the description of the geometric arrangement of the moisture sensor and of the elements forming the moisture sensor, a Cartesian coordinate system is furthermore indicated in the figures, wherein the x-axis and the y-axis lie in the plane of the drawing, and the z-axis extends perpendicular thereto into the plane of the drawing.

The basic construction and the general functioning of a moisture sensor 100 in accordance with one exemplary embodiment will now be described by way of example below with reference to FIGS. 1a-1d.

As is illustrated with reference to the basic schematic cross-sectional illustration in FIG. 1a, the moisture sensor 100 comprises a first and a second electrode structure 102, 104, a moisture-sensitive, dielectric layer element 106 and an insulation structure 108. The insulation structure 108 is formed by a cutout 110 having a (for example circumferential) sidewall region 110-1 and a bottom region 110-2. As is illustrated in FIG. 1a, the moisture-sensitive, dielectric layer element 106 is arranged in the cutout 110 and at least partly fills said cutout 110. In the exemplary illustration in FIG. 1a, the moisture-sensitive, dielectric layer element 106 completely fills the cutout 110, and is embodied flush with an upper main surface region 108-A of the insulation structure 108 for example at a surface region 106-A of the layer element.

Figure 1B:
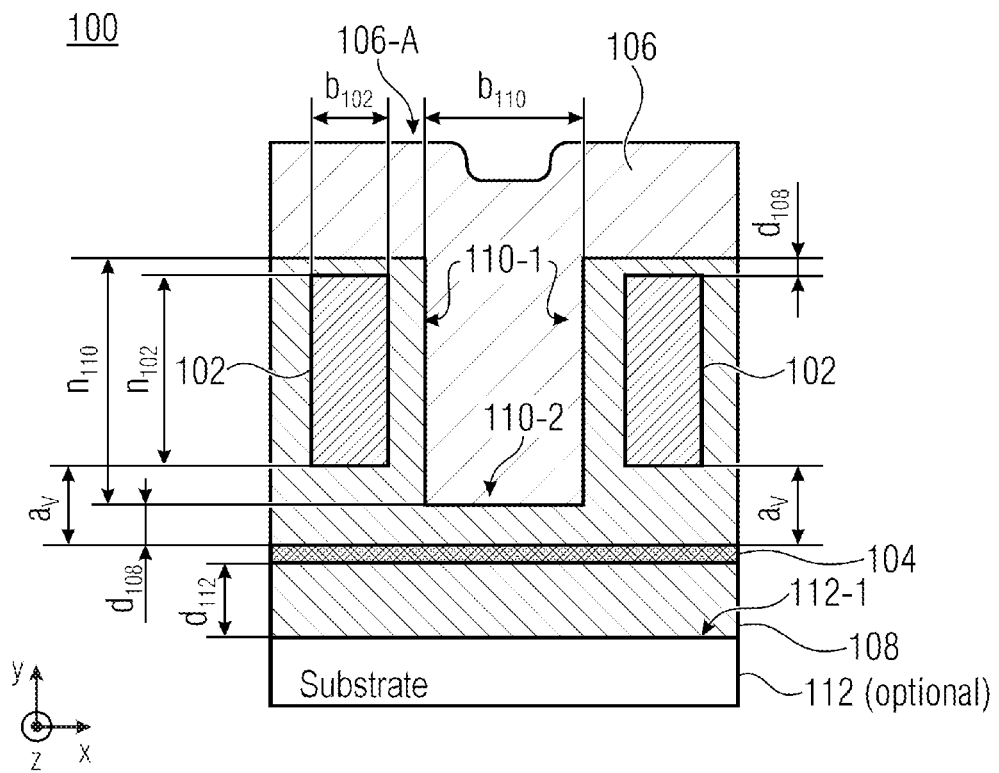
Figure 1C:
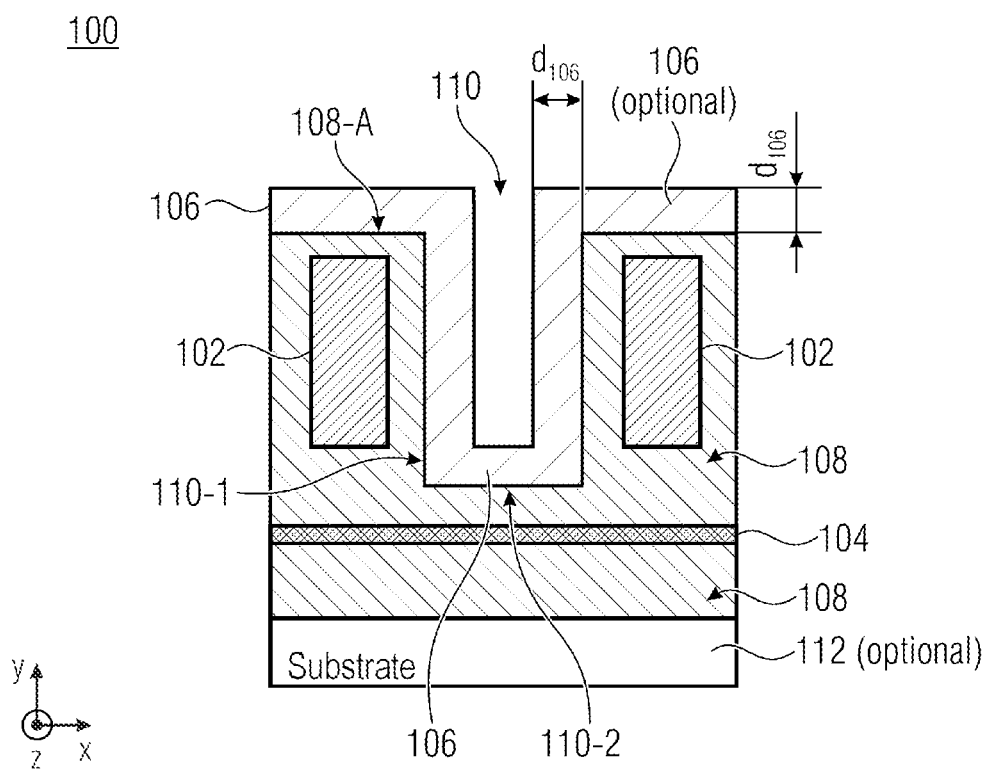

As will additionally be made clear by the following explanations referring to FIGS. 1b and 1c, this configuration should be assumed to be merely by way of example, wherein different geometric configurations of the moisture-sensitive, dielectric layer element 106 in the cutout 110 and optionally at the upper main surface region 108-A of the insulation structure 108 can be implemented.

As is illustrated in FIG. 1a, the first electrode structure 102 is arranged e.g., laterally (=in the x-direction) adjacent to the wall region 110-1 of the cutout 110 and is at least partly or else completely arranged in the material of the insulation structure 108 or embedded therein. The second electrode structure 104 is then arranged e.g., vertically (=in the y-direction) adjacent to the bottom region 110-2 of the cutout 110, and is at least partly or else completely arranged in the material of the insulation structure 108 or embedded therein. Consequently, the first electrode structure 102 is configured as a common capacitor electrode and the second electrode structure 104 is configured as a second common capacitor electrode of a measurement capacitor 102, 104 having the total capacitance $C_G$ for capacitive moisture measurement.

The total capacitance $C_G$ is able to be tapped off via contact connection regions 114, 116, for example, wherein the first contact connection region 114 is connected to the first electrode structure 102, and wherein the second contact connection region 116 is connected to the second electrode structure 104.

As is illustrated in FIG. 1a, the first electrode structure 102 can be connected to a common, first potential $V_1$, while the second electrode structure 104 can be connected to the second potential $V_2$, where $V_1 \neq V_2$, in order to apply a potential difference $\Delta V = V_1 - V_2$ between the first and second electrode structures 102, 104, i.e., across the measurement capacitor 102, 104 having the total capacitance $C_G$. As is evident from FIG. 1a, then, the moisture-sensitive, dielectric layer element 106 is arranged in the cutout 110 between the first and second capacitor electrodes 102, 104 in such a way as to be effective at least regionally as a capacitor dielectric of the measurement capacitor.

The moisture-sensitive, dielectric layer element 106 is configured, then, to have a relative permittivity $\varepsilon_r$ dependent on the relative or absolute moisture in the surrounding atmosphere. The moisture-sensitive, dielectric layer element 106 can comprise a polyimide material, for example. All electrically insulating materials whose relative permittivity is moisture-dependent are suitable, in principle.

The moisture sensor 100 is designed, then, in the event of a potential difference $\Delta V = V_1 - V_2$ being applied between the first and second capacitor electrodes 102, 104 of the measurement capacitor, to provide or to be able to read out a capacitance value $C_G$ dependent on the (relative or absolute) moisture in the surrounding atmosphere.

Further possible configurations or implementations of the individual elements of the moisture sensor 100 will now be illustrated by way of example below with reference to FIGS. 1b and 1c in a basic schematic cross-sectional illustration of the moisture sensor 100.

As is illustrated in FIG. 1b, the moisture-sensitive, dielectric layer element 106 can also be arranged above the upper surface regions 108-A of the insulation structure 108 and completely fills the cutout 110. As is furthermore illustrated in FIG. 1b, a carrier element or substrate 112 can be provided, wherein the second electrode structure 104 arranged in a manner adjoining the bottom region 110-2 of the cutout 110 is arranged between the insulation material of the insulation structure 108 and the carrier element 112. As is furthermore illustrated in FIG. 1b, the second electrode structure 104 can be arranged as a buried electrode structure 104 between the carrier element 112 and the insulation structure 108. As is illustrated by way of example in FIG. 1b, the second electrode structure 104 can also be completely embedded in the material of the insulation structure 108, such that the material of the insulation structure 108 is also situated between the second electrode structure 104 and the carrier element 112.

As is furthermore illustrated by way of example in FIG. 1b, the first and second electrode structures 102, 104, e.g., apart from the contact connection regions or contacting regions (e.g., edge regions) 114, 116, can be at least regionally or else completely embedded in or surrounded by the insulation material of the insulation structure 108.

In accordance with an alternative embodiment (not illustrated in FIG. 1b), the second electrode structure 104 can also be configured as a metallization structure directly on the upper surface region 112-1 of the carrier element 112, wherein in this case for example the carrier element 112 itself can then also comprise an electrically insulating material.

As is evident in FIG. 1b, some dimensions of individual elements of the moisture sensor 100 are then illustrated by way of example therein, wherein the illustrated dimensions or dimension ranges can also vary, e.g., by a factor of 3, in other applications.

As is illustrated by way of example in FIG. 1b, that section of the first electrode structure which extends adjacent to the wall region 110-1 can have a height $h_{102}$ of 0.5 µm±20% (or between 0.1 µm and 2 µm or between 0.2 µm and 1 µm) and a width $b_{102}$ of 0.25 µm±20% (or between 0.05 µm and 1 µm or between 0.1 µm and 0.5 µm). The cutout can have for example a width $b_{110}$ of 0.1 µm to 20 µm (or of 0.5 µm to 5 µm or of 1 to 3 µm) and a height $h_{110}$ of 0.1 µm and 10 µm (or of 0.5 µm and 3 µm or of 1.1 µm to 1.6 µm). The vertical distance $a_v$ between the first and second electrode structures 102, 104 can be for example between 0.05 µm and 10 µm (or between 0.2 µm and 2 µm or between 0.5 µm and 1 µm). Furthermore, the insulation structure 108 surrounding the first electrode structure 102 can have a thickness $d_{108}$ of approximately 0.1 µm±20% (or between 0.01 µm and 1 µm or between 0.05 µm and 0.5 µm). If an insulation material is provided between the carrier element (substrate) 112 and the second electrode structure 104, the thickness $d_{112}$ can be between 1 µm and 50 µm (or between 2 µm and 20 µm or between approximately 5 and 10 µm).

With regard to the dimensions or dimension ranges illustrated in FIG. 1b, it is pointed out that they should be assumed to be merely by way of example for a possible embodiment of the moisture sensor 100, wherein in accordance with the present principle of action of the moisture sensor 100, of course, other dimensions or dimension ratios can also be used and furthermore the functionality of the moisture sensor 100 is equally maintained.

FIG. 1c then illustrates a different configuration of the moisture-sensitive, dielectric layer element 106 in a basic schematic cross-sectional illustration of the moisture sensor 100. In contrast to the illustration of the moisture-sensitive, dielectric layer element 106 from FIG. 1b, in the configuration illustrated in FIG. 1c, the dielectric layer element 106 is configured as a "lining" of the cutout 110, wherein the moisture-sensitive, dielectric layer element 106 covers the wall regions 110-1 and the bottom region 110-2 (at least regionally or else completely) with a relatively uniform layer thickness $d_{106}$. The dielectric layer element 106 can thus be configured as a "conformal" coating of the sidewall regions and the bottom region 110-1, 110-2 of the cutout 110. This for example U-shaped or trough-shaped configuration of the moisture-sensitive, dielectric layer element 106 within the cutout 110 results in an increased or enlarged interaction area (=exposed surface area) of the material of the dielectric layer element 106 with the surrounding atmosphere and with the moisture contained therein. As a result, it is possible to increase the response behavior of the moisture sensor 100 in response to a change in the moisture in the surrounding atmosphere, since e.g., by comparison with the completely filled configuration from FIG. 1a it is possible to obtain a larger interaction area of the moisture-sensitive, dielectric layer element 106. This thus results in a faster response of the moisture sensor 100 to a change in moisture.

By way of the thickness $d_{106}$ of the material of the moisture-sensitive, dielectric layer element 106, it is thus possible to set firstly the response behavior and secondly the achievable signal-to-noise ratio of the moisture sensor 100 by providing the largest possible interaction area of the active layer element 106 with the surrounding atmosphere and furthermore the highest possible permeation of the active layer element 106 by the electric field lines between the first and second electrode structures 102, 104.

As is furthermore illustrated as optional in FIG. 1c, the moisture-sensitive, dielectric layer element 106 configured as a conformal coating can e.g., also extend onto the upper surface region 108-A of the insulation structure 108. The optional region of the insulation structure 108 on the upper surface region 108-A is illustrated in a hatched manner in FIG. 1c.

Figure 1D:
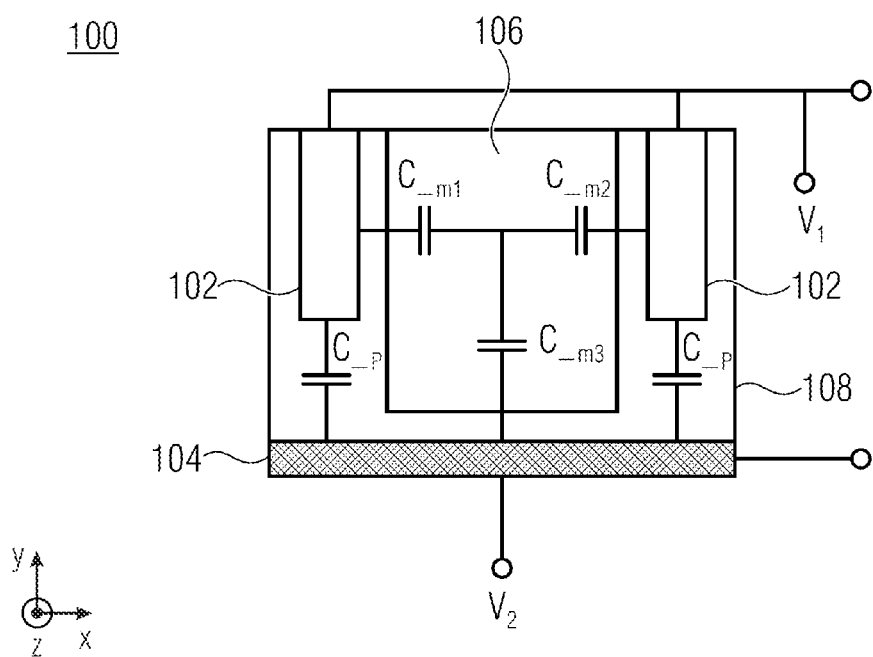
FIG. 1d shows a schematic cross-sectional illustration of the sensor region of the moisture sensor with a basic illustration of the resulting capacitive equivalent circuit diagram in accordance with one exemplary embodiment.

With reference to FIG. 1d in the form of a schematic cross-sectional view, a description will now be given below of the sensor region of the moisture sensor 100 with a basic illustration of the resulting capacitive equivalent circuit diagram on account of the distribution of the electric field between the first and second electrode structures 102, 104.

As described above, given a potential difference $\Delta V$ between the first and second potential connections $V_1$, $V_2$, an electric field E having electric field lines forms between the first and second electrode structures 102, 104.

As is evident from FIG. 1d, the portions $C_{-m1}$, $C_{-m2}$ and $C_{-m3}$ contributing to the measurement capacitance $C_{-M}$ arise on account of the electric field lines passing through the moisture-sensitive, dielectric layer element 106 between the first and second electrode structures 102, 104, while the parasitic capacitances $C_{-P}$, which do not contribute to the measurement, represent the field lines passing between the first and second electrode structures 102, 104 without passing through the moisture-sensitive, dielectric layer element 106.

The higher the electric flux density of the electric field E between the first and second electrode structures 102, 104 in the moisture-sensitive, dielectric layer element 106, the higher the portion of the measurement capacitance $C_{-M}$ ($C_{-m1}$, $C_{-m2}$ and $C_{-m3}$) and the lower the portion of the parasitic capacitance $C_{-P}$ (i.e., the portion which does not contribute to the measurement) in the total capacitance $C_G$ of the moisture sensor 100. It is thus possible to achieve a high resultant measurement signal on the basis of the portion $C_{-M}$ dependent on the ambient moisture in the total capacitance $C_G$ of the moisture sensor 100 and thus a high signal-to-noise ratio (SNR) of the moisture sensor 100.

The ratio of the measurement capacitance $C_M$ relative to the parasitic capacitance $C_P$ thus represents the ratio between the electric field lines passing between the first and second electrode structures 102, 104 within the moisture-sensitive, dielectric layer element 106 (=contribution to the measurement capacitance $C_M$) and those passing outside the moisture-sensitive, dielectric layer element 106 (=contribution to the parasitic capacitance $C_P$).

The moisture sensor 100 can be implemented in various ways. In this regard, the moisture sensor 100 can be arranged for example as a so-called "stand-alone" component or else on a BEOL stack (BEOL=back-end of line) as a single component or else in a group of sensor components.

In the configuration of the moisture sensor 100 for example as a stand-alone component, the carrier element 112 can be configured as a substrate comprising for example an electrically nonconductive material, such as e.g. $Si_xN_y$ or $SiO_x$. In the configuration of the moisture sensor 100 on a BEOL stack, the carrier element 112 can be a metal layer or metal plane of the BEOL stack.

In order to elucidate the term "BEOL stack", it is explained by way of example that such a BEOL stack is arranged on a semiconductor substrate (not shown in FIGS. 1a-1d). Such a semiconductor substrate can be for example a semiconductor wafer, such as a silicon wafer, for example, processed in an FEOL process (FEOL=front-end of line) and optionally comprise an integrated circuit arrangement or an ASIC (ASIC=application-specific integrated circuit) or generally CMOS components, for example, wherein the BEOL layer stack is then applied to the semiconductor wafer in the BEOL process. The BEOL layer stack (also called wiring layer stack) is provided, for example, in order to provide for the FEOL components connection structures, i.e., predefined connections among FEOL components and/or connections to terminal contacts at the top side of the layer stack. The metallization structures of the BEOL layer stack comprise for example a metal or a metal alloy, such as e.g., copper, aluminum, etc., and are embedded into an insulation material. These explanations with regard to a BEOL stack should only be taken into consideration, however, provided that the carrier element 112 is part of such a BEOL stack.

The insulation structure 108 can be configured for example as a passivation layer structure comprising a passivation material, such as e.g., silicon nitride or an oxide material, e.g., $SiO_x$, wherein the insulation material or passivation material of the insulation structure 108 provides for or effects an electrical decoupling of the first and second electrode structures 102, 104.

The cutout 110 in the insulation or passivation layer structure 108 can for example be in the shape of a trench, i.e., elongate, or have (as a sectional view in the x-z-plane=projection in the y-direction in FIGS. 1a-1d) a circular, rectangular, square, oval or any desired polygonal circumferential shape, wherein the first electrode structure 102 can be configured in a manner at least regionally adjoining the cutout 110 or else completely extending around or surrounding the cutout 110.

Since the first electrode structure 102 is configured as the first common (short-circuited) capacitor electrode, for example all sections of the first electrode structure 102 are short-circuited and connected to the first reference potential $V_1$. Furthermore, for the second electrode structure 104, which is illustrated as continuous in FIGS. 1a-1d, it holds true that for the case of a subdivision of the second electrode structure 104 the individual elements of the second electrode structure 104 are short-circuited with one another and connected to the second reference potential $V_2$.

The functional principle of the moisture sensor 100 can be summarized, then, to the effect that the first and second electrode structures 102, 104 are offset or spaced apart vertically (i.e., in the y-direction=parallel to the x-z-plane) with respect to one another. The active material 106 for the moisture sensor 100, e.g., a polyimide material, changes its dielectric properties on the basis of the moisture levels in the surrounding atmosphere and is arranged so as to interact with electrical "leakage fields" between the first and second electrode structures 102, 104. In this case, the active (=moisture-sensitive) dielectric layer element forms the moisture-dependent capacitor dielectric of the measurement capacitor between the first and second capacitor electrodes 102, 104.

On account of the geometric arrangement of the first and second electrode structures 102, 104 in a vertical orientation with respect to one another (in the y-direction) with regard to the upper main surface region 106-A and 108-A, respectively, the moisture sensor 100 illustrated in FIGS. 1a-1d can thus also be referred to as a "vertical" moisture sensor 100.

In accordance with the exemplary embodiment of the moisture sensor 100 as illustrated in FIGS. 1a-1d, it is possible to read out the measurement capacitance between the first electrode structure 102, which is arranged laterally adjacent to the lateral wall region 110-1 of the cutout 110 with the moisture-sensitive, dielectric layer element 106 arranged therein, and the second electrode structure 104 arranged vertically with respect to the first electrode structure and adjacent to the bottom region 110-2 of the cutout 110.

A further possible configuration of the moisture sensor 100 in accordance with one exemplary embodiment will now be described below with reference to FIGS. 2a and 2b in a basic schematic cross-sectional illustration.

With regard to the explanations below, it is pointed out that substantially the above explanations with regard to FIGS. 1a-1d are applicable equally to the moisture sensor 100 illustrated in FIGS. 2a-2b, predominantly the modifications and/or supplementations of the moisture sensor 100 being discussed below.

Figure 2A:
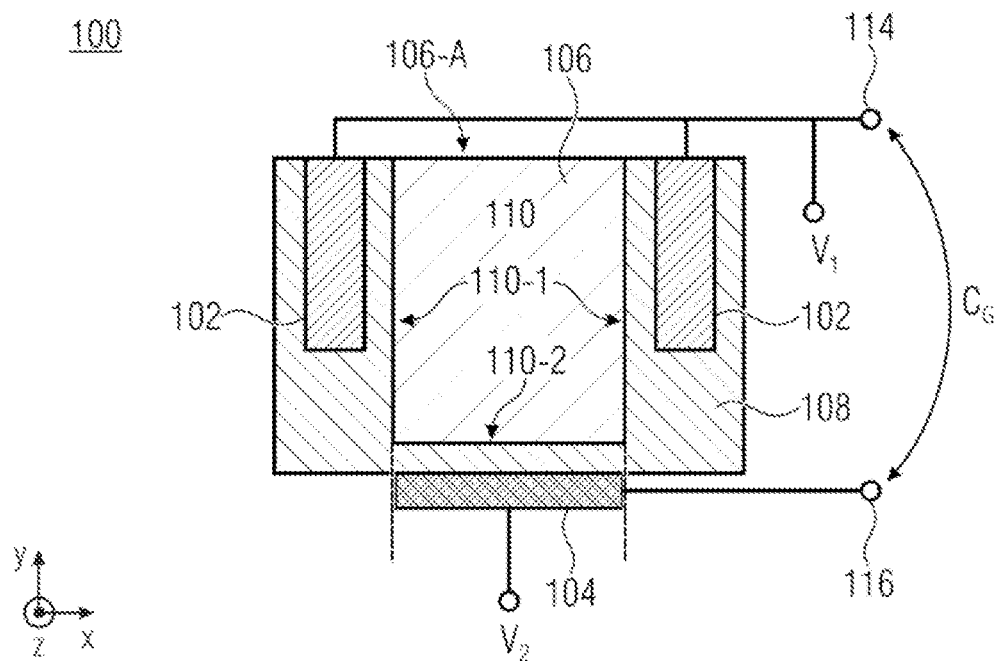
FIG. 2a shows a basic schematic cross-sectional illustration of a moisture sensor in accordance with a further exemplary embodiment.

As is illustrated by way of example in FIG. 2a, the moisture sensor 100 comprises, over the first and second electrode structures 102, 104, the moisture-sensitive, dielectric layer element 106 and also the insulation structure or passivation layer structure 108 having the cutout 110, having in each case a sidewall region 110-1 and a bottom region 110-2. The moisture-sensitive, dielectric layer element 106 is arranged in the cutout 110 and at least partly fills the latter. The first electrode structure 102 is arranged adjacent to the wall region 110-1 of the cutout and at least partly in the insulation structure 108, wherein the first electrode structure 102 is configured as a first common, e.g., electrically interconnected or short-circuited capacitor electrode and the second electrode structure 104 is configured as a second common capacitor electrode of a measurement capacitor having a total capacitance $C_G$ for capacitive moisture measurement.

As is illustrated in FIG. 2a, the electrode structure 104 is configured so as, with regard to a vertical projection (in the y-direction), substantially to overlap the cutout 110 and not to overlap the first electrode structure 102 arranged laterally with respect thereto.

By virtue of this arrangement of the second electrode structure, in the event of a potential difference $\Delta V$ being applied between the first and second electrode structures 102, 104, it is possible to compress the resultant electric field between the first and second electrode structures 102, 104 within the cutout 110 and thus within the material of the moisture-sensitive, dielectric layer element, such that an increased field concentration leads to an increased permeation and interaction with the material of the moisture-sensitive, dielectric layer element 106. As a result, the resultant parasitic capacitance $C_{\_P}$ through the material, e.g., oxide material, of the insulation structure 108 is reduced, and accordingly the measurement capacitance $C_{\_M}$ ($C_{\_m1}$, $C_{\_m2}$ and $C_{\_m3}$) through the dielectric layer element 106 is increased, as a result of which it is possible to obtain an improved response behavior and an increased sensitivity of the moisture sensor 100 to a change in the moisture in the surrounding atmosphere.

Figure 3A:
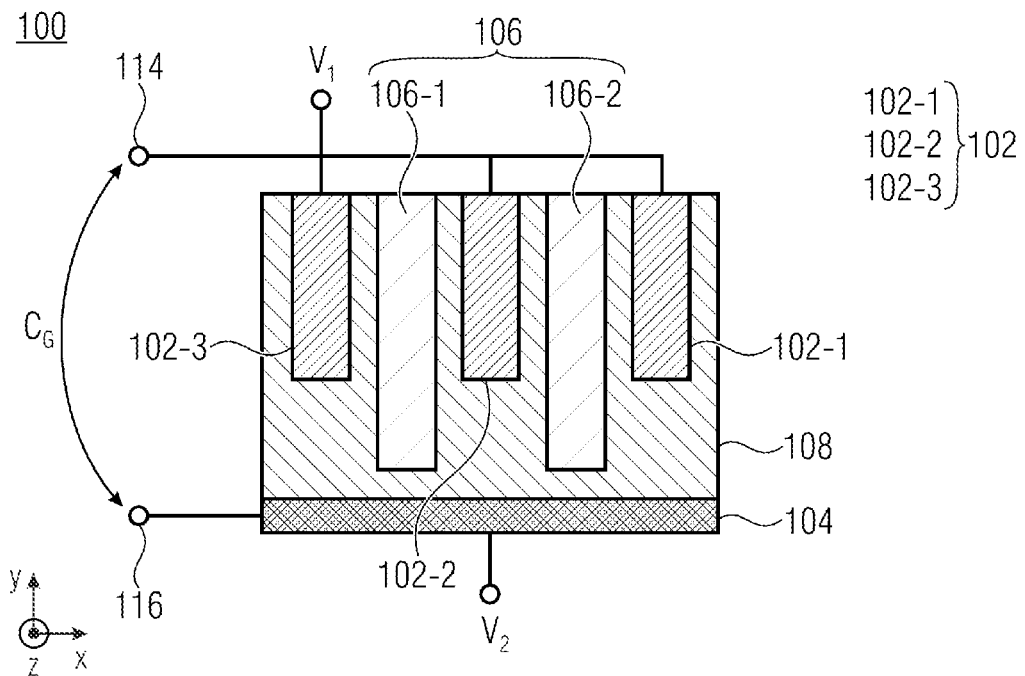
FIGS. 3a-3c show basic schematic cross-sectional illustrations of a moisture sensor in accordance with a further exemplary embodiment.
Figure 3B:
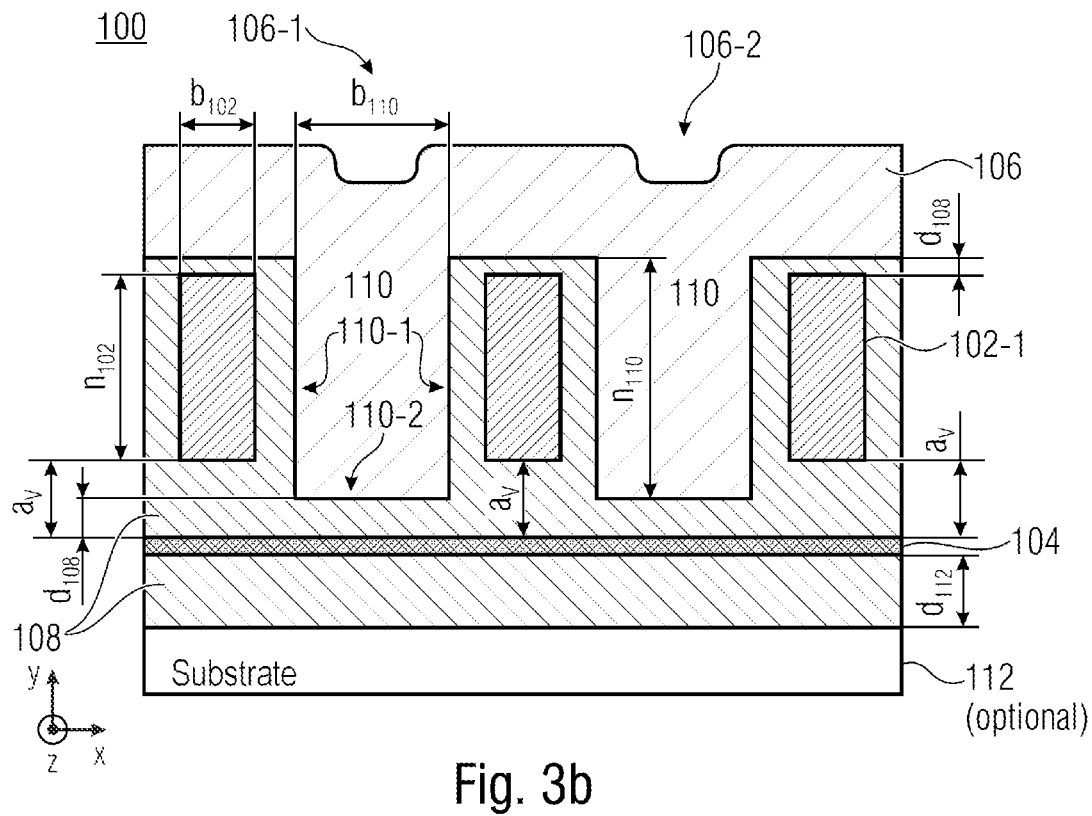
Figure 3C:
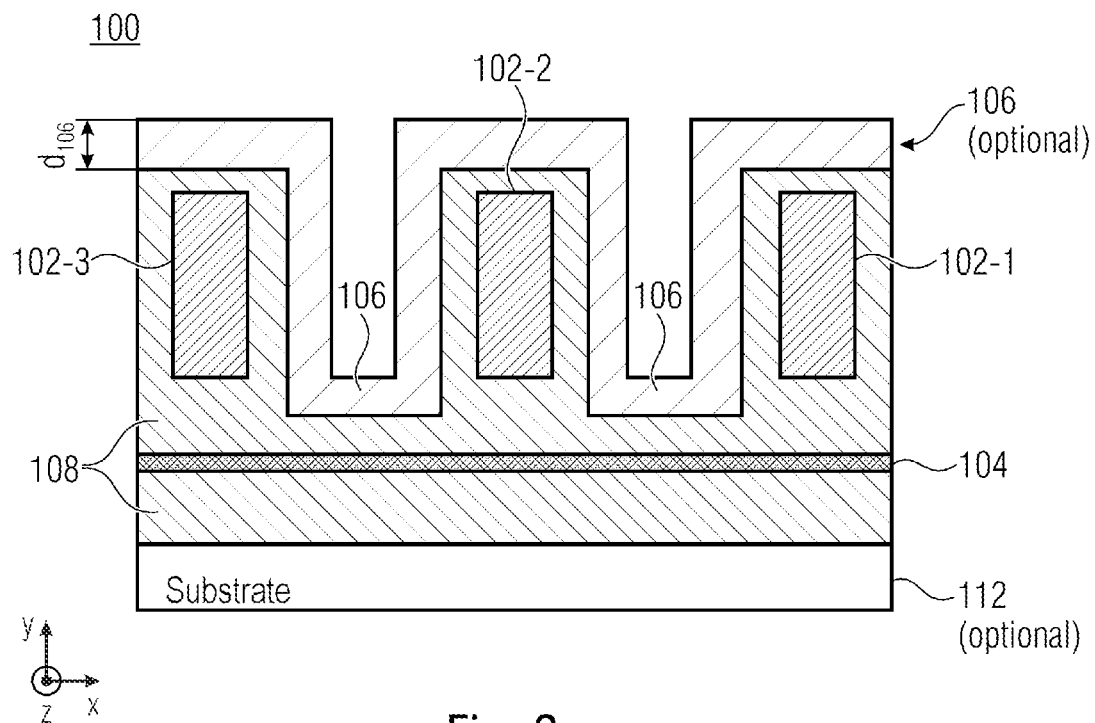
Figure 3D:
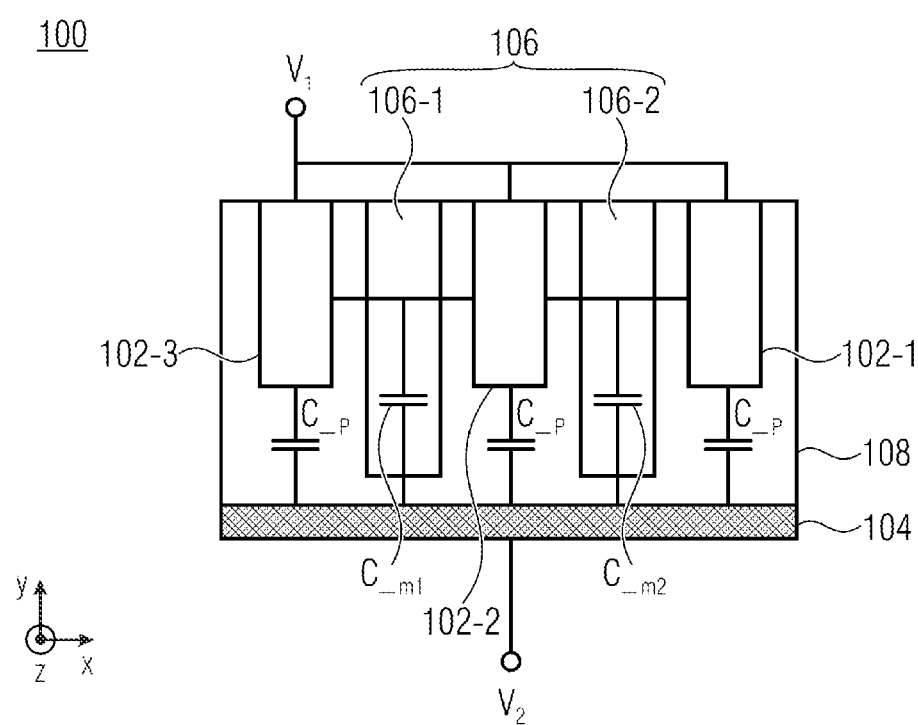
FIG. 3d shows a schematic cross-sectional illustration of the sensor region of the moisture sensor with a basic illustration of the resulting capacitive equivalent circuit diagram in accordance with a further exemplary embodiment.

With regard to the capacitive equivalent circuit diagram in FIG. 3d, it is pointed out that a simplified capacitive model of the moisture sensor 100 is assumed there to the effect that the height $h_{110}$ of the cutouts 110 is much greater than the width $b_{110}$ of the cutout 110, e.g., at least by a factor of 5 or 10. In this case, a relatively homogenous potential profile generated laterally across the cutout or the trench 110 can be assumed. This state reduces the model to three parallel capacitances, two capacitances $C_{\_P}$ (parasitic capacitances) with the insulation material (e.g., oxide) of the insulation structure 108 as dielectric and the intervening, central measurement capacitance $C_{\_M}$ with the material, e.g., a polyimide material, of the moisture-sensitive, dielectric layer element 106.

Figure 2B:
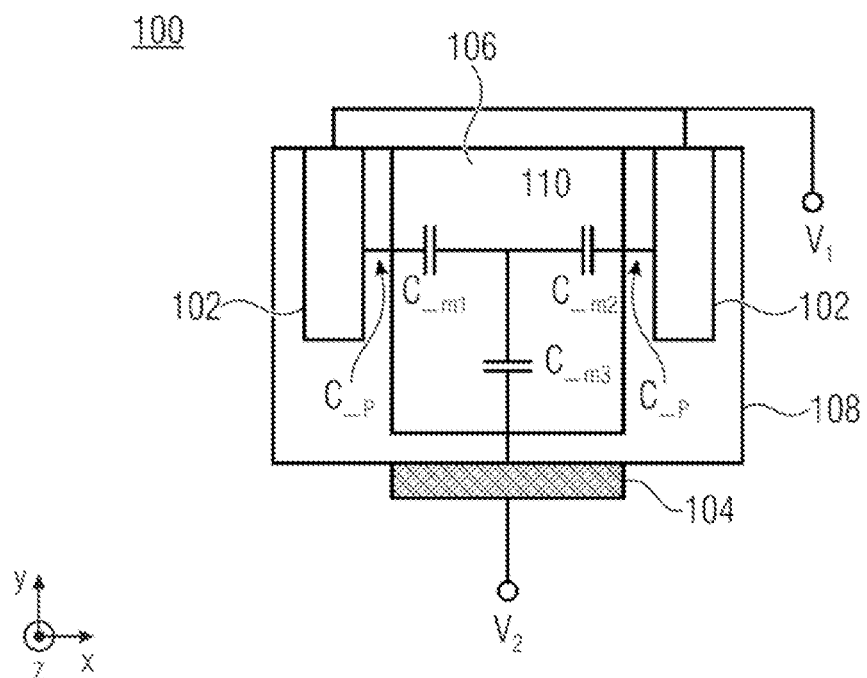
FIG. 2b shows a schematic cross-sectional illustration of the sensor region of the moisture sensor with a basic illustration of the resulting capacitive equivalent circuit diagram in accordance with a further exemplary embodiment.

FIG. 2b then shows a basic illustration of the resultant capacitive equivalent circuit diagram of the measurement capacitance by way of example in the form of a schematic cross-sectional view of the sensor region of the moisture sensor 100. As is evident in FIG. 2b, as a result the resultant parasitic capacitance $C_{\_P}$ can be at least decreased or greatly reduced, while the measurement capacitance $C_{\_M}$ ($C_{\_m1}$, $C_{\_m2}$ and $C_{\_m3}$) can be significantly increased and a significant increase in the sensitivity of the moisture sensor 100 can thus be obtained.

A further configuration of the moisture sensor 100 in accordance with one exemplary embodiment will now be described below with reference to FIGS. 3a-3d.

With regard to the moisture sensor 100 described below, it is pointed out that the above explanations with regard to FIGS. 1a-1d and 2a-2b are applicable equally to the moisture sensor 100 in FIGS. 3a-3d, substantially the supplementations and modifications of the moisture sensor 100 being discussed below.

As is illustrated in FIG. 3a on the basis of a basic schematic cross-sectional illustration of the moisture sensor 100 in accordance with one exemplary embodiment, the moisture sensor once again comprises a first and a second electrode structure 102, 104, a moisture-sensitive, dielectric layer element 106, and an insulation structure 108. The insulation structure 108 now has for example a plurality of cutouts 110, each having a sidewall region 110-1 and a bottom region 110-2. As is illustrated in FIG. 3a, the moisture-sensitive, dielectric layer element 106 is arranged in the cutouts 110 and at least partly fills the latter. The first electrode structure 102 comprises for example a plurality of electrically interconnected first partial electrode structures 102-1, 102-2, 102-3 arranged e.g., at the outer sidewall regions 110-1 and between adjacent sidewall regions 110-1 of the cutouts 110 e.g., parallel to the sidewall regions 110-1 of the cutouts. The second electrode structure 104 is in turn arranged (vertically) adjacent to the bottom region 110-2 of the cutouts 110 at least partly within the insulation structure 108. Furthermore, the interconnected first partial electrode structures 102-1, 102-2, 102-3 form the first electrode structure 102, which is in turn configured as a first common, short-circuited (=shortened) capacitor electrode, while the second electrode structure 104 is configured as the second common capacitor electrode of the measurement capacitor 102, 104 having a total capacitance $C_G$ for capacitive moisture measurement.

In accordance with one exemplary embodiment, a respective one of the first partial electrode structures 102-1, 102-2, 102-3 can at least regionally or completely surround laterally the respective one of the cutouts 110. In accordance with one exemplary embodiment, the first partial electrode structures 102-1, 102-2, 102-3 of the first electrode structure 102 can also be arranged in a strip-shaped fashion between adjacent cutouts or trenches 110 and parallel to the sidewall regions 110-1 of the cutouts or trenches 110. As is illustrated in FIG. 3a, the material, e.g., a polyimide material, of the moisture-sensitive, dielectric layer element 106 is arranged at least regionally between the first partial electrode structures 102-1, 102-2, 102-3.

As is illustrated in FIG. 3a, the first partial electrode structures 102-1, 102-2, 102-3 are arranged e.g., laterally (=in the x-direction) adjacent to the wall region 110-1 of the cutouts 110 and are at least partly or else completely arranged in the material of the insulation structure 108 or embedded therein. The second electrode structure 104 is then arranged e.g., vertically (=in the y-direction) adjacent to the bottom region 110-2 of the cutout 110, and is at least partly or else completely arranged in the material of the insulation structure 108 or embedded therein. Consequently, the first electrode structure 102 is configured as a common capacitor electrode and the second electrode structure 104 is configured as a second common capacitor electrode of a measurement capacitor 102, 104 having the total capacitance $C_G$ for capacitive moisture measurement, wherein the moisture-sensitive, dielectric layer element 106 is once again configured to have a relative permittivity $\varepsilon_r$ dependent on the relative or absolute moisture in the surrounding atmosphere.

Further possible configurations or implementations of the individual elements of the moisture sensor 100 will now be illustrated by way of example below with reference to FIGS. 3b and 3c in a basic schematic cross-sectional illustration of the moisture sensor 100.

As is illustrated in FIG. 3b, the moisture-sensitive, dielectric layer element 106 can also be arranged above the upper surface regions 108-A of the insulation structure 108 and completely fills the cutouts 110. As is furthermore illustrated in FIG. 3b, once again a carrier element or substrate 112 can be provided.

As is evident in FIG. 3b, by way of example once again some dimensions of individual elements of the moisture sensor 100 are then illustrated by way of example therein, wherein the dimension indications from FIG. 1b can correspondingly be applied here.

FIG. 3c then illustrates a different configuration of the moisture-sensitive, dielectric layer element 106 in a basic schematic cross-sectional illustration of the moisture sensor 100. In contrast to the illustration of the moisture-sensitive, dielectric layer element 106 from FIG. 3b, in the configuration illustrated in FIG. 3c, the dielectric layer element 106 is configured as a "lining" of the cutout 110, wherein the moisture-sensitive, dielectric layer element 106 covers the wall regions 110-1 and the bottom region 110-2 of the cutouts 110 (at least regionally or else completely) with a relatively uniform layer thickness d106. The dielectric layer element 106 can thus be configured as a "conformal" coating of the sidewall regions and the bottom regions 110-1, 110-2 of the cutouts 110. By way of the thickness d106 of the material of the moisture-sensitive, dielectric layer element 106, it is thus possible to set firstly the response behavior and secondly the achievable signal-to-noise ratio of the moisture sensor 100 by providing the largest possible interaction area of the active layer element 106 with the surrounding atmosphere and furthermore the highest possible permeation of the active layer element 106 by the electric field lines between the first and second electrode structures 102, 104.

As is furthermore illustrated as optional in FIG. 3c, the moisture-sensitive, dielectric layer element 106 configured as a conformal coating can e.g., also extend onto the upper surface region 108-A of the insulation structure 108. The optional region of the insulation structure 108 on the upper surface region 108-A is illustrated in a hatched manner in FIG. 3c.

With reference to FIG. 3d in the form of a schematic cross-sectional view, a description will now be given below of the sensor region of the moisture sensor 100 with a basic illustration of the resulting capacitive equivalent circuit diagram on account of the distribution of the electric field between the first and second electrode structures 102, 104.

As is evident from FIG. 3d, the portions $C_{-m1}$, $C_{-m2}$ and $C_{-m3}$ contributing to the measurement capacitance $C_{-M}$ arise on account of the electric field lines passing through the moisture-sensitive, dielectric layer element 106 between the first partial electrode structures 102-1, 102-2, 102-3 and the second electrode structure 104, while the parasitic capacitances $C_{-P}$, which do not contribute to the measurement, represent the field lines passing between the first and second electrode structures 102, 104 without passing through the moisture-sensitive, dielectric layer element 106. The more field lines of the electric field E pass through the moisture-sensitive, dielectric layer element 106 between the first and second electrode structures 102, 104, the higher the portion of the measurement capacitance $C_{-M}$ and the lower the portion of the parasitic capacitance $C_{-P}$ (i.e., the portion which does not contribute to the measurement) in the total capacitance $C_G$ of the moisture sensor 100.

The cutouts 110 in the insulation or passivation layer structure 108 can for example be in the shape of a trench, i.e., elongate, or have (as a sectional view in the x-z-plane) a circular, rectangular, square, oval or any desired polygon-progression-shaped circumferential shape, wherein the first electrode structure 102 can be configured in a manner at least regionally adjoining the cutout 110 or else completely extending around or surrounding the cutout 110. Since the first electrode structure 102 is configured as the first common (short-circuited) capacitor electrode, for example all sections of the first electrode structure 102 are short-circuited and connected to the first reference potential $V_1$. Furthermore, for the second electrode structure 104, which is illustrated as continuous in FIGS. 3a-3d, it holds true that for the case of a subdivision of the second electrode structure 104 the individual elements of the second electrode structure 104 are short-circuited with one another and connected to the second reference potential $V_2$.

The functional principle of the moisture sensor 100 can be summarized, then, again to the effect that the first and second electrode structures 102, 104 are offset or spaced apart vertically (i.e., in the y-direction=parallel to the x-z-plane) with respect to one another. The active material 106 for the moisture sensor 100, e.g., a polyimide material, changes its dielectric properties on the basis of the moisture levels in the surrounding atmosphere and is arranged so as to interact with electrical "leakage fields" or primarily with the vertical portion thereof between the first and second electrode structures 102, 104. In this case, the active (=moisture-sensitive) dielectric layer element 106 forms the moisture-dependent capacitor dielectric of the measurement capacitor between the first and second capacitor electrodes 102, 104.

On account of the geometric arrangement of the first and second electrode structures 102, 104 in a vertical orientation with respect to one another (in the y-direction) with regard to the upper main surface region 108-A, the moisture sensor 100 illustrated in FIGS. 3a-3d can thus in turn also be referred to as a "vertical" moisture sensor.

With regard to the capacitive equivalent circuit diagram in FIG. 3d, it is pointed out that a simplified capacitive model of the moisture sensor 100 is assumed there to the effect that the depth $h_{110}$ of the cutouts 110 is much greater than the width $b_{110}$ of the cutout 110, e.g., at least by a factor of 5 or 10. In this case, a relatively homogenous potential profile generated laterally across the cutout or the trench 110 can be assumed. This state reduces the model to three parallel capacitances, two capacitances $C_{-P}$ (parasitic capacitances) with the insulation material (e.g., oxide) of the insulation structure 108 as dielectric and the intervening, central measurement capacitance $C_{-M}$ with the material, e.g., a polyimide material, of the moisture-sensitive, dielectric layer element 106.

A further implementation of the moisture sensor 100 in accordance with one exemplary embodiment will now be described by way of example below with reference to FIGS. 4a-4d.

With regard to the moisture sensor 100 described below, it is pointed out that the above explanations with regard to FIGS. 1a-1d, 2a-2b and 3a-3d are applicable equally to the moisture sensor 100 in FIGS. 4a-4d, substantially the supplementations and modifications of the moisture sensor 100 being discussed below.

Figure 4A:
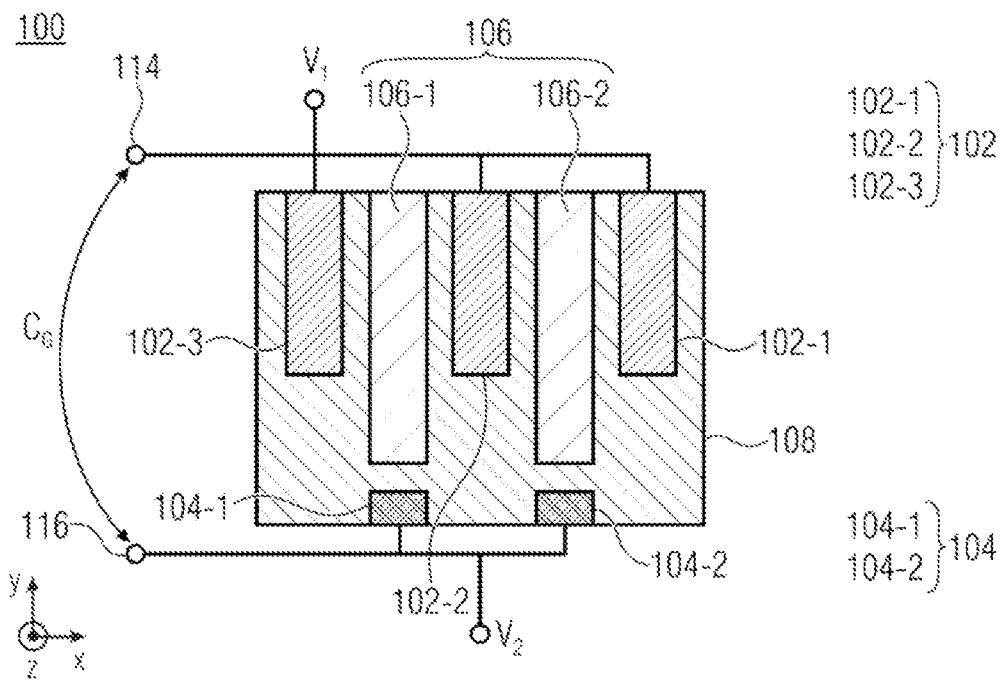
FIGS. 4a-4c show basic schematic cross-sectional illustrations of the moisture sensor in accordance with a further exemplary embodiment.

As is illustrated by way of example in FIG. 4a in a basic schematic cross-sectional illustration of the moisture sensor 100 in accordance with one exemplary embodiment, the moisture sensor 100 once again comprises a first and a second electrode structure 102, 104, a moisture-sensitive, dielectric layer element 106, and an insulation structure 108. The insulation structure 108 now has for example a plurality of cutouts 110, each having a sidewall region 110-1 and a bottom region 110-2. As is illustrated in FIG. 4a, the moisture-sensitive, dielectric layer element 106 is arranged in the cutouts 110 and at least partly fills the latter. The first electrode structure 102 comprises for example a plurality of electrically interconnected first partial electrode structures 102-1, 102-2, 102-3 arranged e.g., at the outer sidewall regions 110-1 and between adjacent sidewall regions 110-1 of the cutouts 110 e.g., parallel to the sidewall regions 110-1 of the cutouts. The second electrode structure 104 is in turn arranged (vertically) adjacent to the bottom region 110-2 of the cutouts 110 at least partly within the insulation structure 108. Furthermore, the interconnected first partial electrode structures 102-1, 102-2, 102-3 form the first electrode structure, which is in turn configured as a first common, short-circuited (=shortened) capacitor electrode, while the second electrode structure 104 is configured as the second common capacitor electrode of the measurement capacitor 102, 104 having a total capacitance $C_G$ for capacitive moisture measurement.

As is illustrated by way of example in FIG. 4a, the second electrode structure can comprise electrically interconnected second partial electrode structures 104-1, 104-2 arranged vertically adjacent to the respective bottom region 110-2 of the cutouts 110. The second electrode structure 104 can thus comprise patterned, short-circuited second partial electrode structures 104-1, 104-2 arranged for example substantially complementarily to or in a manner overlapping the basic area of the cutouts 110 with regard to a vertical projection (in the y-direction). This arrangement of the first and second electrode structures 102, 104 can serve for reducing the parasitic capacitances $C_{-P}$.

Figure 4B:
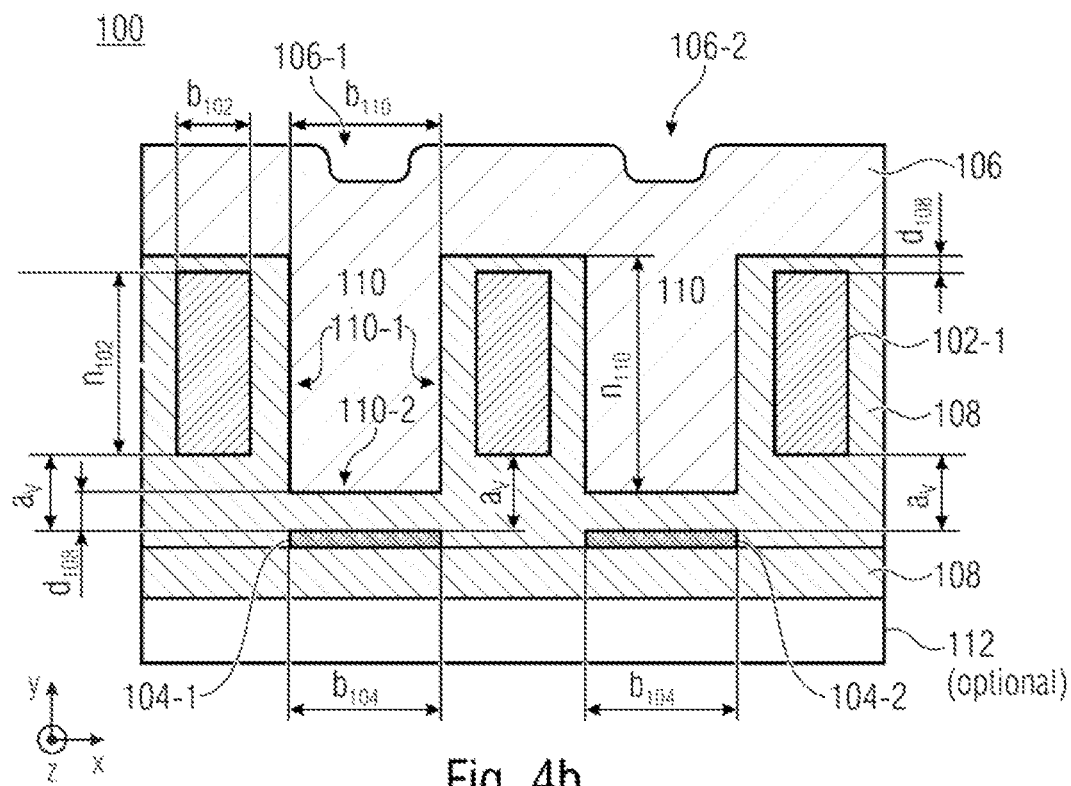
Figure 4C:
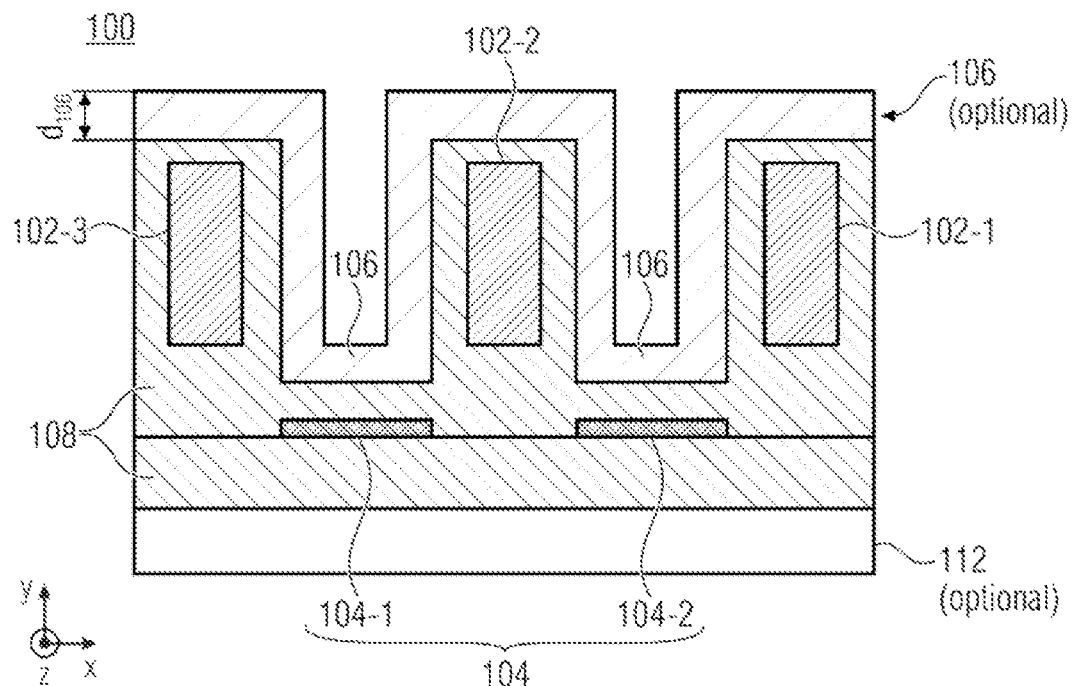
Figure 4D:
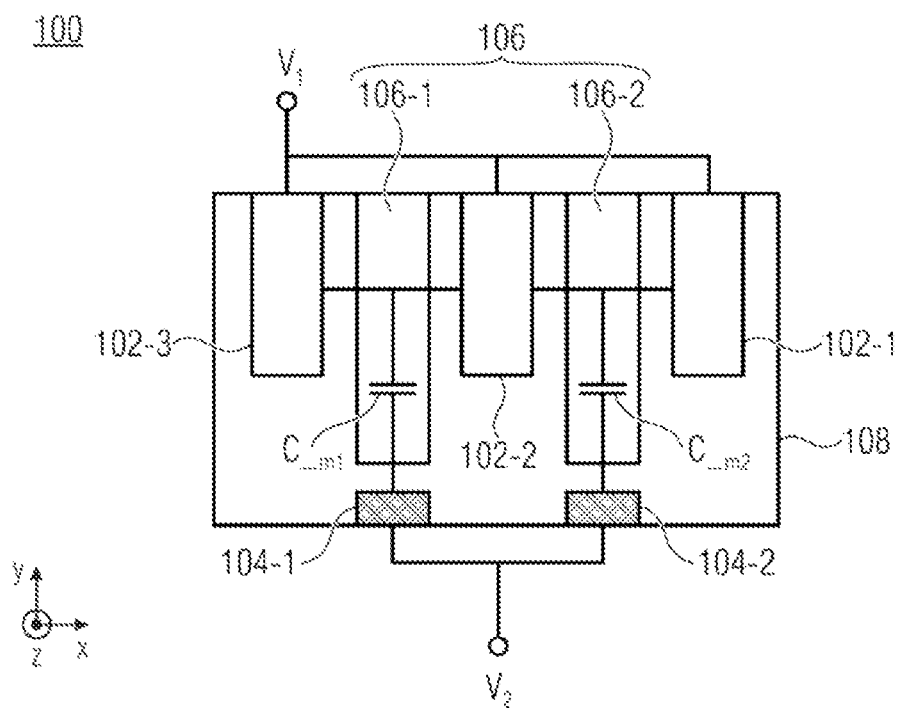
FIG. 4d shows a schematic cross-sectional illustration of the sensor region of the moisture sensor with a basic illustration of the resulting capacitive equivalent circuit diagram in accordance with a further exemplary embodiment.

In the moisture sensor 100 in FIG. 4a, the first and second electrode structures 102, 104 are again arranged offset or at a distance vertically (i.e., in the y-direction) with respect to one another. With reference to FIGS. 4b and 4c, in a basic schematic cross-sectional illustration of the moisture sensor 100, by way of example further possible configurations or implementations of the individual elements of the moisture sensor 100 are illustrated, as has already been described by way of example for a continuous second electrode structure 104 in FIGS. 3b and 3c.

On the basis of the arrangement of the second electrode structure 104 as illustrated in FIGS. 4a-4d, it is possible to reduce the parasitic lateral capacitances $C_{-P}$ with the insulation material of the insulation structure 108 as dielectric, which are insensitive vis-à-vis changes in moisture, by increasing the width and height of the topmost metal lines or first partial electrode structures 102-1, 102-2, 102-3.

In the configuration illustrated in FIGS. 4a-4d, the second partial electrode structures 104-1, 104-2 of the second electrode structure 104 are configured so as, with regard to a vertical projection (in the y-direction), substantially to overlap the cutouts 110 and not to overlap the first partial electrode structures 102-1, 102-2, 102-3 of the first electrode structure 102 that are arranged laterally with respect thereto. The second partial electrode structures 104-1, 104-2 are thus arranged in a manner overlapping vertically (in the y-direction) the cutouts 110 and the moisture-sensitive, dielectric layer element 106 arranged therein, such that substantially no overlap with the first partial electrode structures 102-1, 102-3, 102-3 of the first electrode structure 102 occurs with regard to a vertical projection (in the y-direction).

This results in a lower parasitic capacitance $C_{-P}$ and an increased measurement capacitance $C_{-M}$ of the moisture sensor 100 and thus in turn to an increased sensitivity of the moisture sensor 100 vis-à-vis changes in moisture in the surrounding atmosphere.

In accordance with one exemplary embodiment, a first contact connection area 114 can be provided, which is electrically connected to the first electrode structure 102, and a second contact connection area 116 can furthermore be present, which is connected to the second electrode structure 104. The first and second contact connection areas 114, 116 can be provided in order to read out the capacitance value $C_G$ of the measurement capacitance 102, 104 formed by the first and second electrode structures.

As is evident in FIG. 4b, by way of example once again some dimensions of individual elements of the moisture sensor 100 are then illustrated by way of example therein, wherein the dimension indications from FIG. 3b can correspondingly also be applied here. In FIG. 4b, merely in addition the width $b_{104}$ of the second partial electrode structures 104-1, 104-2 is indicated, wherein the width $b_{104}$ can be approximately 0.5 μm to 3 μm (or 0.2 μm to 5 μm).

A further exemplary embodiment of a moisture sensor 200 in accordance with a further exemplary embodiment will now be described below with reference to FIGS. 5a-5d. The arrangement of the moisture sensor 200 as illustrated in FIGS. 5a-5d can also be referred to as an individual element or an elementary cell of the moisture sensor 200, wherein the moisture sensor 200 can comprise a plurality of e.g., parallel-connected elementary cells.

Figure 5A:
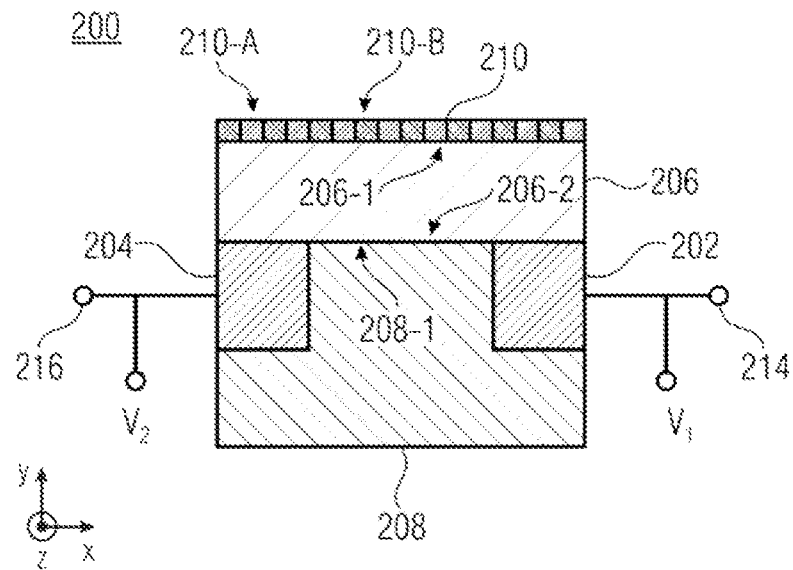
Figure 5B:
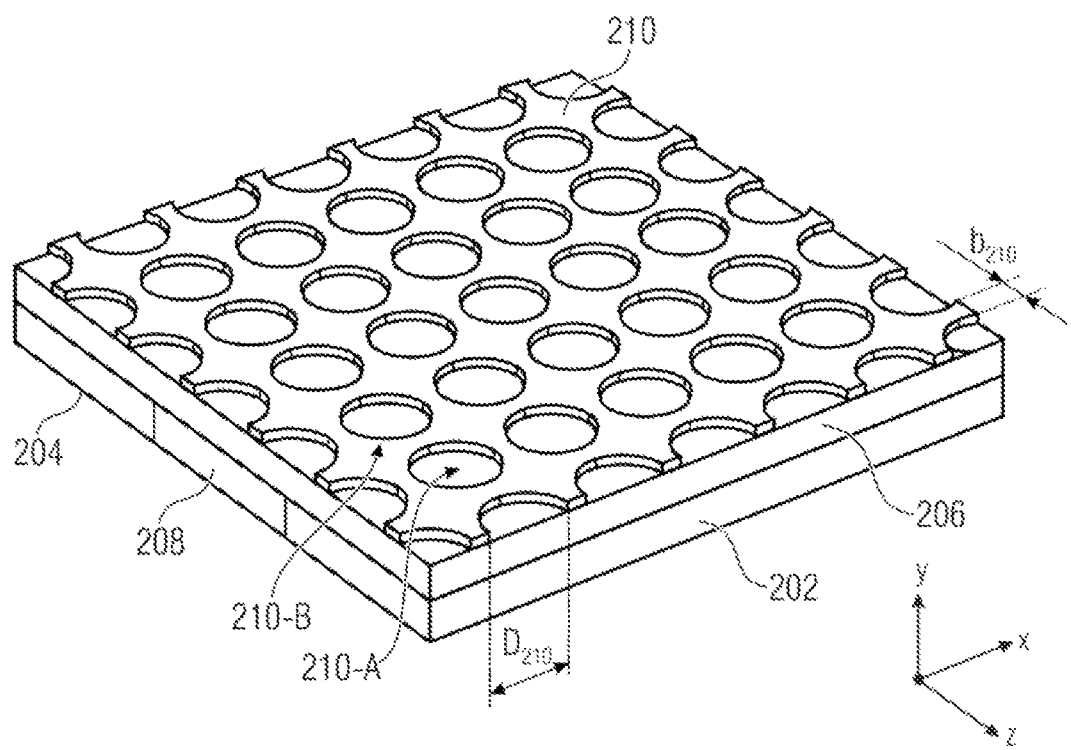
FIG. 5b shows a basic schematic 3D illustration of a moisture sensor in accordance with one exemplary embodiment.

As is illustrated in the basic schematic cross-sectional illustration in FIG. 5a, the moisture sensor 200 comprises a carrier element 208 comprising an insulating material, a first and a second electrode structure 202, 204 arranged at a distance from one another at the carrier element 208, a moisture-sensitive, dielectric layer element 206 at a first main surface region 208-1 of the carrier element 208 and adjacent to the first and second electrode structures 202, 204, and a third electrode structure 210 on a first main surface region 206-1 of the moisture-sensitive, dielectric layer element 206, such that the moisture-sensitive, dielectric layer element 206 is arranged between the third electrode structure 210 and the first electrode structure 202 and between the third electrode structure 210 and the second electrode structure 204. The carrier element 208 can furthermore optionally comprise a substrate 212, see FIG. 5b.

As is illustrated in FIG. 5a, the third electrode structure 210 is thus arranged at a first main surface region 206-1 of the dielectric layer element 206, while the first and second electrode structures are arranged adjacent to the second main surface region 206-2 of the dielectric layer element 206 and in a manner spaced apart laterally (=in the x-direction) with respect to one another.

The first electrode structure 202 is configured as a first capacitor electrode of a measurement capacitor, wherein the second electrode structure 204 is configured as a second capacitor electrode of the measurement capacitor 202, 204 having the total capacitance $C_G$ for capacitive moisture measurement. The third electrode structure 210 is configured as a floating electrode structure.

The floating electrode structure 210 can be configured as a conductive layer having openings 210-A having an opening diameter $D_{210}$ and webs 210-B having a web width $b_{210}$, which mechanically connect and surround the openings 210-A, such that the moisture-sensitive, dielectric element 206 is accessible to the surrounding atmosphere through said openings 210-A. The floating electrode structure 210 can thus be configured as a perforated or grid-shaped conductive layer.

In the event of a potential difference $\Delta V$ being applied between the first and second capacitor electrodes 202, 204 of the measurement capacitor, the floating electrode structure is configured to collect or to concentrate the electrical leakage field between the first and second electrode structures 202, 204. The floating electrode structure 210 can comprise a polysilicon material or a metal, for example. The moisture-sensitive, dielectric layer element 206 can have a relative permittivity $\varepsilon_r$ dependent on the moisture in the surrounding atmosphere. The relative permittivity $\varepsilon_r$ of the dielectric layer element 206 is thus dependent on the moisture absorbed from the surrounding atmosphere.

In the case of the application of a potential difference $\Delta V$ as difference between the first potential connection $V_1$ at the first electrode structure 202 and the second potential connection $V_2$ at the second electrode structure 204 and the resultant potential difference between the first and second capacitor electrodes 202, 204 of the measurement capacitor, a capacitance value dependent on the moisture in the surrounding atmosphere is able to be read out. The capacitance value $C_G$ which is able to be read out is thus dependent on the amount of moisture absorbed into the likewise moisture-sensitive, dielectric layer element 206.

The first and second electrode structures 202, 204 can be embedded at least regionally in the insulating material of the carrier element 208. The moisture-sensitive, dielectric layer element 206 can for example once again comprise a polyimide material. Furthermore, a first and a second contact connection area 214, 216 can once again be provided, wherein the first contact connection area 214 is electrically connected to the first electrode structure 202, and wherein the second contact connection area 216 is electrically connected to the second electrode structure 204.

The floating electrode structure 210 can be formed by metal processing processes on the insulation material or polyimide material of the moisture-sensitive, dielectric layer element 206. This may for example necessitate subjecting the polyimide material of the moisture-sensitive, dielectric layer element 206 to a special treatment, such as e.g., a thermal treatment, in order to obtain for example curing of the polyimide material.

The moisture sensor 200 illustrated in FIGS. 5a-5d once again constitutes a vertical component. In the design illustrated, the first and second electrode structures 202, 204 are arranged adjacent to one another (side by side) with an intervening insulation material, e.g., the insulation material of the carrier element 208. By virtue of the arrangement of the floating electrode structure (=floating contact) 210, there is then the possibility of detecting the electric field extending from the first and second electrode structures 202, 204 vertically (in the y-direction), wherein the electric field lines pass through the dielectric layer element 206 substantially vertically (in the y-direction) on account of the arrangement of the floating electrode structure 210. As a result, the interaction of the electric field lines with the insulation material, e.g., a polyimide material, of the moisture-sensitive, dielectric layer element 206 can be significantly increased or maximized.

The perforated metal structure of the floating electrode structure 210 makes it possible that the moisture-sensitive, dielectric layer element 206 can react with the surrounding atmosphere, e.g., air, or is exposed to the surrounding atmosphere. One possible geometric configuration of the moisture sensor is illustrated in a 3D view by way of example in FIG. 5b.

Since the measurement capacitance for both electrode structures 202, 204 runs vertically, parasitic capacitances are substantially assigned to a lateral electric field component through the insulation material, e.g., oxide material, of the carrier element 208. This enables the resultant sensitivity of the moisture sensor 200 to be increased, wherein furthermore an optimization of the electrode thickness and spacing can be effected as well. The electrode thickness can be chosen to be as small as possible, for example, in order to reduce the area of the lateral parasitic capacitances. An (as optimum as possible) electrode spacing can e.g., be calculated in advance and is dependent on various parameters, such as e.g., electrode thickness, distance from the substrate, thickness of the polyimide, etc. In addition, an EM shielding (EM=electromagnetic) of the floating electrode structure 210 can be taken into consideration in this design approach. The electrical shielding can be realized e.g., by a corresponding packaging.

The moisture sensor 200 illustrated in FIG. 5c comprises a plurality of elementary cells (cf. FIGS. 5a, 5d) arranged in a multiply "mirrored" (e.g., at the axis $M_1$ or the axes $M_1$, $M_2$, $M_3$, . . . ) and parallel-connected manner. One such elementary cell of the moisture sensor 200 is highlighted by the dashed border in FIG. 5c. Hence in FIG. 5c the outer electrodes 202 should be regarded as the first common electrode 202 and the central electrode 204 should be regarded as the second electrode 204.

As is evident in FIG. 5c, some dimensions of individual elements of the moisture sensor 200 are then illustrated by way of example therein, wherein the illustrated dimensions or dimension ranges can also vary, e.g., by a factor of 3, in other applications.

As is furthermore illustrated in FIG. 5c, a carrier element or substrate 212 can be provided, wherein the first and second electrode structures 202, 204 can be arranged as a buried electrode structure in the insulation material of the insulation structure 208 between the carrier element 212 and the dielectric layer element 206. The first and second electrode structures 202, 204 can thus also be completely arranged in the material of the insulation structure 208 or embedded therein, such that the material of the insulation structure 208 can be situated between the first electrode structure 202 and the carrier element 212 and between the second electrode structure 204 and the carrier element 212.

As is illustrated by way of example in FIG. 5c, the first and second electrode structures 202, 204 can for example each have a thickness $d_{202}$, $d_{204}$ of 330 nm±20% (or between 100 nm and 1000 nm or between 200 nm and 600 nm). Furthermore, the first and second electrode structures 202, 204 each have for example a width $b_{202}$, $b_{204}$ of 0.5 μm±20% (or between 0.1 μm and 3 μm or between 0.2 μm and 1 μm). The moisture-sensitive, dielectric layer element 206 can have a thickness $d_{206}$ of between 0.1 μm and 10 μm (or between 0.2 μm and 6 μm or between 0.5 mm and 3 μm).

If an insulation material of the insulation structure 208 is provided between the first and/or the second electrode structure 202, 204 and the dielectric layer element 206, the thickness $d_{208}$ of the insulation material can be 0.1 μm±20% (or between 0.01 μm and 1 μm or between 0.05 μm and 0.2 μm). If an insulation material of the insulation structure 208 is provided between the carrier element (substrate) 212 and the first and/or the second electrode structure 202, 204, the thickness $d_{212}$ of the insulation material can be between 1 and 50 μm (or between 2 μm and 20 μm or between 5 μm and 10 μm).

As is illustrated by way of example in FIG. 5c, the third electrode structure 210 can have for example in each case a thickness $d_{210}$ of 330 nm±20% (or between 100 nm and 1000 nm or between 200 nm and 600 nm). Furthermore, the third electrode structure 210 can for example have an opening diameter $D_{210}$ of 0.5 μm±20% (or between 0.1 μm and 3 μm or between 0.2 μm and 1 μm) and have a web width $b_{210}$ of 0.5 μm±20% (or between 0.1 μm and 3 μm or between 0.2 μm and 1 μm).

With regard to the dimensions or dimension ranges illustrated in FIG. 5c, it is pointed out that they should be assumed to be merely by way of example for a possible embodiment of the moisture sensor 200, wherein in accordance with the present principle of action of the moisture sensor 200, of course, other dimensions or dimension ratios can also be used and furthermore the functionality of the moisture sensor 200 is equally maintained.

Figure 5D:
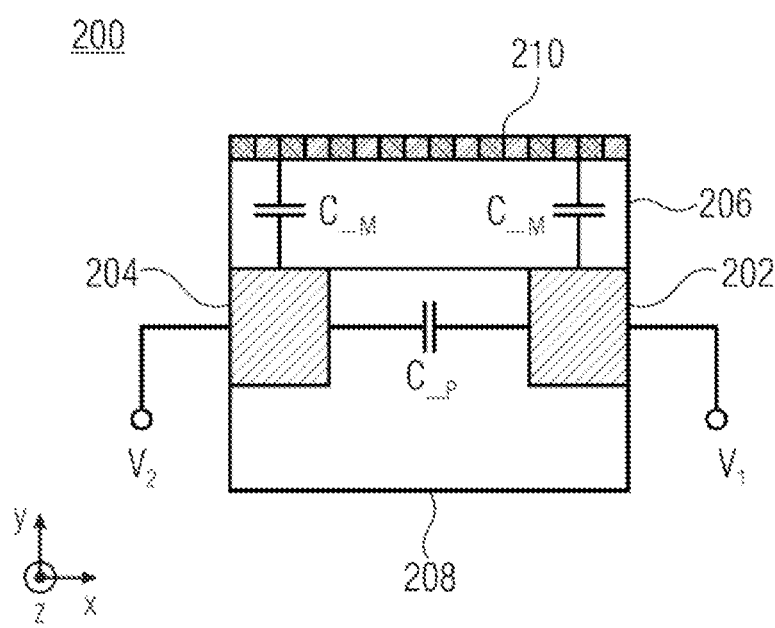
FIG. 5d shows a schematic cross-sectional illustration of the sensor region of the moisture sensor with a basic illustration of the resulting capacitive equivalent circuit diagram in accordance with one exemplary embodiment.

A description will now be given below, with reference to FIG. 5d in the form of a schematic cross-sectional view, of the sensor region of the moisture sensor 200 with a basic illustration of the resulting portions of the acting electric field or the resultant capacitive equivalent circuit diagram.

As discussed above, the measurement capacitances $C_{-M}$ extend vertically between the first electrode structure 202 and the floating electrode structure 210 and between the second electrode structure 204 and the floating electrode structure 210, since the electric field occurring between the first and second electrode structures 202, 204 is concentrated or short-circuited in the floating electrode structure 210. On account of the geometric arrangement, the parasitic capacitance $C_{\_P}$ present directly between the first and second electrode structures 202, 204 is relatively small or negligible to a first approximation.

By virtue of this arrangement of the third electrode structure 210, in the event of a potential difference ΔV being applied between the first and second electrode structures 202, 204, it is possible to compress the resultant electric field between the first and second electrode structures 202, 204 substantially within the material of the moisture-sensitive, dielectric layer element 206, such that an increased field concentration leads to an increased permeation and interaction with the material of the moisture-sensitive, dielectric layer element 206. As a result, the resultant parasitic capacitance $C_{\_P}$ through the material, e.g., oxide material, of the insulation structure 208 is reduced, and accordingly the measurement capacitance $C_{\_M}$ through the dielectric layer element 206 is increased, as a result of which it is possible to obtain an improved response behavior and an increased sensitivity of the moisture sensor 200 to a change in the moisture in the surrounding atmosphere.

An overview of one possible production method for producing the moisture sensor 100 illustrated by way of example in FIG. 3b and FIG. 3c, respectively, is described briefly below with reference to FIG. 6.

Firstly, in step 6-0, a substrate or the carrier element 112 is provided.

In a step 6-1, an insulation material is applied on the substrate or carrier element 112 for example by a CVD method.

In a further step 6-2, a metal layer (metal 1) is applied, which later serves as the second electrode structure.

In step 6-3, an insulation material (insulator 2) is applied on the second electrode structure 204 once again by a CVD method, for example.

In a step 6-4, the first electrode structure 102 having the first partial electrode structures 102-1, 102-2, 102-3 is formed or patterned.

In a step 6-5, a further insulator material of the insulation structure 108 (insulator 3) is applied by a CVD method.

In step 6-6, a planarization as far as the upper surface regions of the first partial electrode structures 102-1, 102-2, 102-3 is carried out.

In step 6-7, a metal passivation as final layer is applied on the planarized surface and forms a further section of the insulation structure (passivation layer structure) 108.

In step 6-8, the cutouts or trenches are formed, e.g. by a trench etch method, in the insulation structure 108 between the first partial electrode structures 102-1, 102-2, 102-3.

In step 6-9a, the moisture-sensitive, dielectric layer element 106 is deposited for example conformally on the surface topography present, as a result of which the cutouts or trenches 110 are not completely filled, as is illustrated for example in the case of the moisture sensor 100 from FIG. 3c.

In an alternative step 6-9b, the material of the moisture-sensitive, dielectric layer element 106 is deposited non-conformally, such that the cutouts 110 are completely filled, as is illustrated by way of example in the case of the moisture sensor 100 from FIG. 3b.

A further method for producing the moisture sensor 100 having a plurality of cutouts 110, said moisture sensor being illustrated by way of example in FIG. 4b and FIG. 4c, respectively, will now be described below with reference to FIG. 7.

Figure 6:
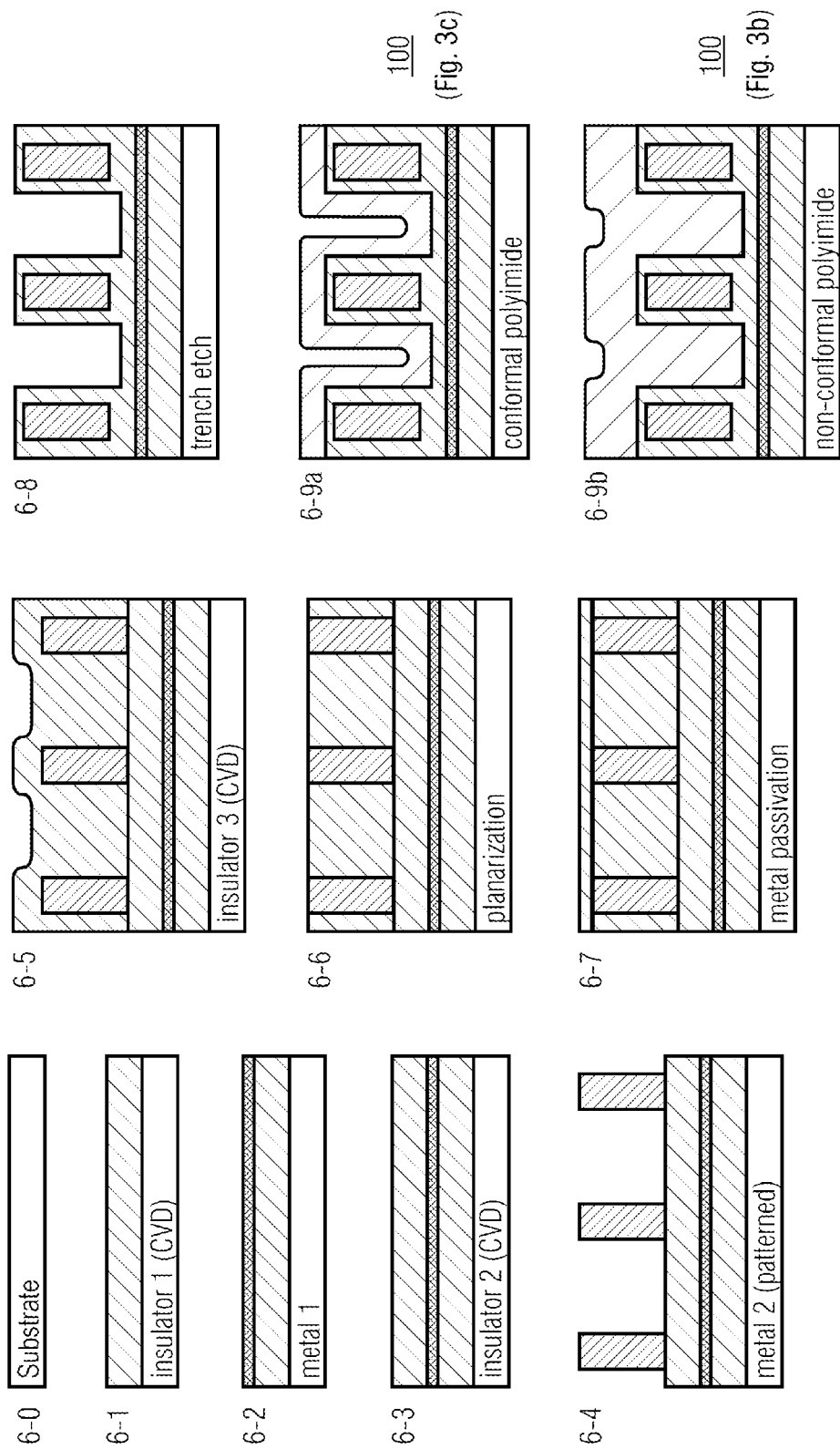
FIG. 6 shows a basic flow diagram of a method or process sequence for producing a moisture sensor in accordance with one exemplary embodiment.
Figure 7:
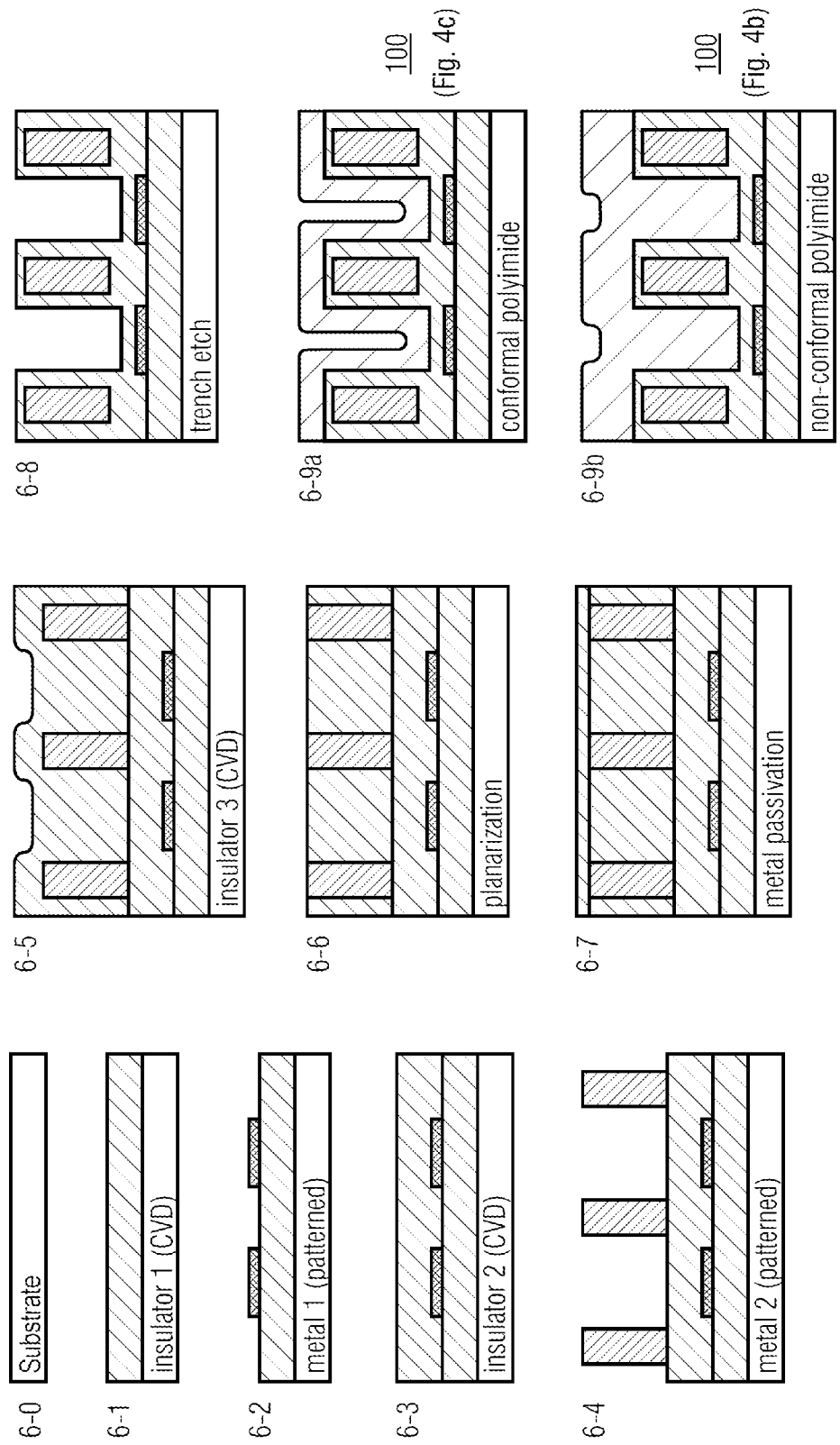
FIG. 7 shows a basic flow diagram of a method or process sequence for producing a moisture sensor in accordance with a further exemplary embodiment.

The production method illustrated in FIG. 7 differs from the method illustrated in FIG. 6 merely in step 6-2' to the effect that the applied metal layer (metal 1) forming the second electrode structure 204 is patterned in order to form the electrically interconnected, short-circuited second partial electrode structures 204-1, 204-2.

In step 6-9a in FIG. 7, the moisture-sensitive, dielectric layer element 106 is deposited for example conformally onto the surface topography present, as a result of which the cutouts or trenches 110 are not completely filled, as is illustrated by way of example in the case of the moisture sensor 100 from FIG. 4c.

In an alternative step 6-9b in FIG. 7, the material of the moisture-sensitive, dielectric layer element 106 is deposited non-conformally, such that the cutouts 110 are completely filled, as is illustrated by way of example in the case of the moisture sensor 100 from FIG. 4b.

One possible method for producing the moisture sensor 200 illustrated in FIGS. 5a-5d in accordance with a further exemplary embodiment will now be described below with reference to FIG. 8.

Figure 8:
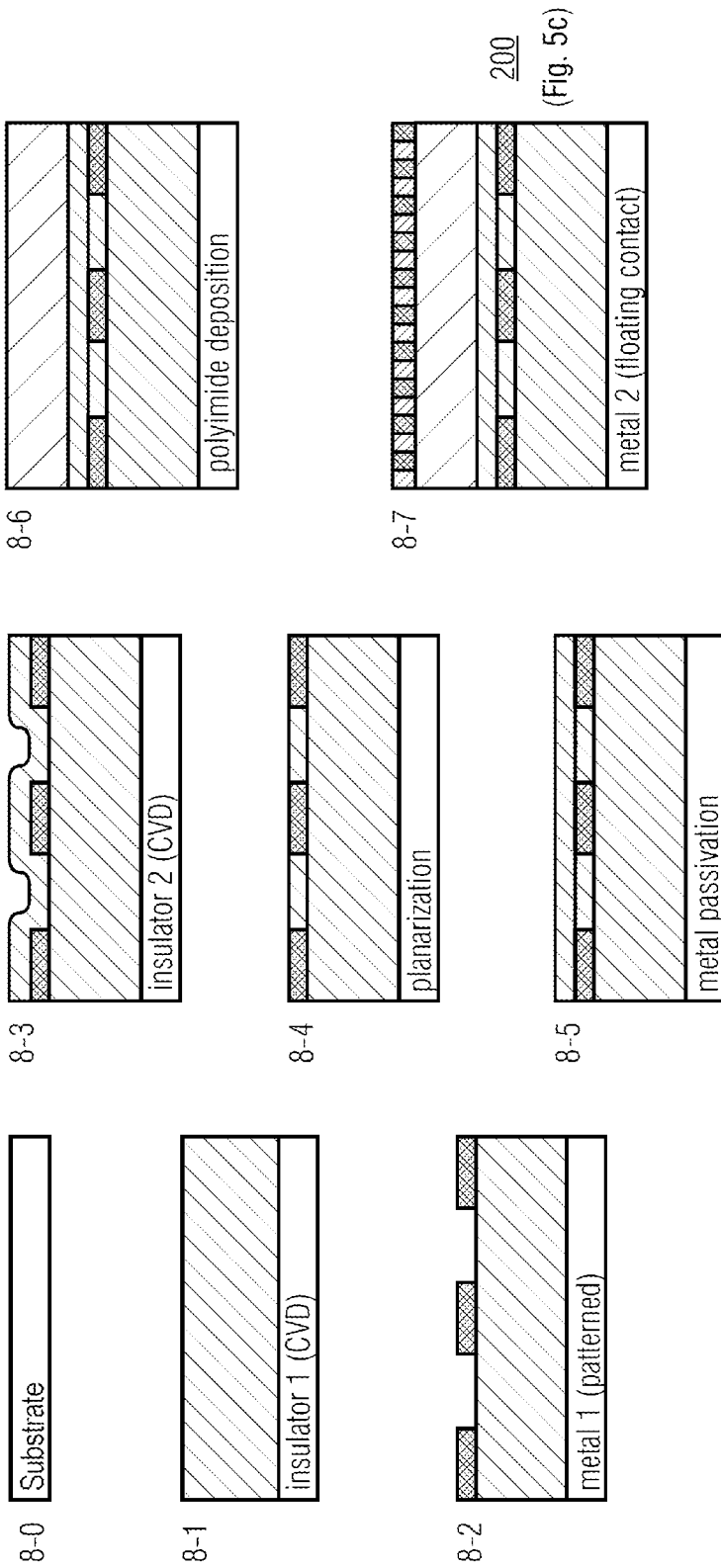
FIG. 8 shows a basic flow diagram of a method or process sequence for producing a moisture sensor in accordance with a further exemplary embodiment.

As is illustrated in FIG. 8, firstly in a step 8-0 the carrier element 212 is provided. An insulation material (insulator 1) of the insulation structure 208 is applied on the carrier element 212 by a CVD method.

In step 8-2, a metal layer (metal 1) is applied in a patterned manner in order to form the first and second electrode structures arranged in a manner spaced apart from one another at the carrier element 212.

In step 8-3, a further insulator material (insulator 2) is applied for example once again by a CVD method, and in step 8-4 is planarized in order to form a further section of the carrier element 212.

In step 8-5, a metal passivation layer is applied in order to cover the first and second electrode structures and to form a further section of the carrier element.

In step 8-6, the moisture-sensitive, dielectric layer element 206 is applied, e.g., by a polyimide deposition.

In step 8-7, finally, the third electrode structure is applied as a floating electrode structure, which is configured as a conductive, perforated or grid-shaped layer, as is illustrated for example in the case of the moisture sensor 200 from FIG. 5c.

In accordance with one exemplary embodiment, a moisture sensor 100 comprises a first and a second electrode structure 102, 104, a moisture-sensitive, dielectric layer element 106, and an insulation structure 108 having a cutout 110 having a sidewall region 110-1 and a bottom region 110-2. The moisture-sensitive, dielectric layer element 106 is arranged in the cutout 110 and at least partly fills the latter, wherein the first electrode structure 102 is arranged adjacent to the wall region 110-1 of the cutout 110 at least partly in the insulation structure 108, wherein the second electrode structure 104 is arranged adjacent to the bottom region 110-2 of the cutout 110 at least partly in the insulation structure 108, and wherein the first electrode structure 102 is configured as a first common capacitor electrode and the second electrode structure 104 is configured as a second common capacitor electrode of a measurement capacitor 102, 104 for capacitive moisture measurement.

In accordance with one exemplary embodiment, the moisture-sensitive, dielectric layer element 106 is configured to be effective at least regionally as a capacitor dielectric of the measurement capacitor between the first and second capacitor electrodes 102, 104.

In accordance with one exemplary embodiment, the moisture-sensitive, dielectric layer element 106 has a relative permittivity dependent on the moisture in the surrounding atmosphere.

In accordance with one exemplary embodiment, in the event of a potential difference ΔV being present between the first and second capacitor electrodes 102, 104 of the measurement capacitor, a capacitance value dependent on the moisture in the surrounding atmosphere is able to be read out.

In accordance with one exemplary embodiment, the moisture sensor 100 furthermore comprises a carrier element 112, wherein the second electrode structure 104 arranged in a manner adjoining the bottom region 110-2 of the cutout 110 is arranged between the insulation material of the insulation structure 108 and the carrier element 112.

In accordance with one exemplary embodiment, the second electrode structure 104 is arranged as a buried electrode structure between the carrier element 112 and the insulation structure 108.

In accordance with one exemplary embodiment, the carrier element 112 comprises a substrate or a metal layer.

In accordance with one exemplary embodiment, the insulation structure 108 comprises an insulation material, wherein the first and second electrode structures 102, 104 are embedded at least regionally in the insulation material of the insulation structure 108.

In accordance with one exemplary embodiment, the moisture sensor 100 comprises a plurality of cutouts 110 in the insulation structure 108, each of said cutouts having a sidewall region 110-1 and a bottom region 110-2.

In accordance with one exemplary embodiment, the first electrode structure 102 comprises a plurality of electrically interconnected first partial electrode structures 102-1, 102-2, 102-3 arranged parallel to the sidewall regions 110-1 of the cutouts 110.

In accordance with one exemplary embodiment, one of the first partial electrode structures 102-1, 102-2, 102-3 respectively surrounds one of the cutouts 110.

In accordance with one exemplary embodiment, the first electrode structure 102 is arranged in a strip-shaped fashion between adjacent cutouts 110 and parallel to the sidewall regions 110-1 of the cutouts 110.

In accordance with one exemplary embodiment, a polyimide material is arranged between the first partial electrode structures 102-1, 102-2, 102-3.

In accordance with one exemplary embodiment, the second electrode structure 104 comprises electrically interconnected second partial electrode structures 104-1, 104-2 arranged vertically adjacent to the bottom region 110-2 of the cutouts 110.

In accordance with one exemplary embodiment, the moisture-sensitive, dielectric layer element 106 comprises a polyimide material.

In accordance with one exemplary embodiment, the moisture-sensitive, dielectric layer element completely covers the sidewall regions 110-1 and the bottom regions 110-2 of the cutouts 110 and/or completely fills the cutouts 110.

In accordance with one exemplary embodiment, the moisture sensor 100 comprises a first contact connection area 114, which is connected to the first electrode structure 102, and a second contact connection area 116, which is connected to the second electrode structure 104.

In accordance with one exemplary embodiment, a moisture sensor 200 comprises a carrier element 208 comprising an insulating material, a first and a second electrode structure 202, 204 arranged at a distance from one another at the carrier element 208, a moisture-sensitive, dielectric layer element 206 at a first main surface region 208-1 of the carrier element 208 and adjacent to the first and second electrode structures 202, 204, and a third electrode structure 210 on a first main surface region 206-1 of the moisture-sensitive, dielectric layer element 206, such that the moisture-sensitive, dielectric layer element 206 is arranged between the third electrode structure 210 and the first electrode structure 202 and between the third electrode structure 210 and the second electrode structure 204. In this case, the first electrode structure 202 is configured as a first capacitor electrode and the second electrode structure 204 is configured as a second capacitor electrode of a measurement capacitor 202, 204 for capacitive moisture measurement, wherein the third electrode structure 210 is configured as a floating electrode structure.

In accordance with one exemplary embodiment, the floating electrode structure 210 comprises a conductive layer having openings 210-A, such that the moisture-sensitive, dielectric layer element 206 is accessible to the surrounding atmosphere through the openings 210-A.

In accordance with one exemplary embodiment, in the event of a potential difference ΔV being present between the first and second capacitor electrodes 202, 204 of the measurement capacitor, the floating electrode structure 210 is configured for collecting the electrical leakage field between the first and second electrode structures 202, 204.

In accordance with one exemplary embodiment, the floating electrode structure 210 comprises an electrically conductive material.

In accordance with one exemplary embodiment, the moisture-sensitive, dielectric layer element 206 has a relative permittivity dependent on the moisture in the surrounding atmosphere.

In accordance with one exemplary embodiment, in the event of a potential difference being present between the first and second capacitor electrodes 202, 204 of the measurement capacitor, a capacitance value dependent on the moisture in the surrounding atmosphere is able to be read out.

In accordance with one exemplary embodiment, the first and second electrode structures 202, 204 are embedded at least regionally in the insulating material of the carrier element 208.

In accordance with one exemplary embodiment, the moisture-sensitive, dielectric layer element 206 comprises a polyimide material.

In accordance with one exemplary embodiment, the moisture sensor 200 comprises a first contact connection area 214, which is connected to the first electrode structure 202, and a second contact connection area 216, which is connected to the second electrode structure 204.

In accordance with one exemplary embodiment, the moisture-sensitive, dielectric layer element 206 is configured to be effective at least regionally as a capacitor dielectric of the measurement capacitor.

Although some aspects of the present disclosure have been described as features in the context of a device, it is clear that such a description can likewise be regarded as a description of corresponding method features. Although some aspects have been described as features in association with a method, it is clear that such a description can also be regarded as a description of corresponding features of a device or of the functionality of a device.

In the detailed description above, in some instances different features have been grouped together in examples in order to rationalize the disclosure. This type of disclosure ought not to be interpreted as the intention that the claimed examples have more features than are expressly indicated in each claim. Rather, as represented by the following claims, the subject matter can reside in fewer than all features of an individual example disclosed. Consequently, the claims that follow are hereby incorporated in the detailed description, wherein each claim can be representative of a dedicated separate example. While each claim can be representative of a dedicated separate example, it should be noted that although dependent claims refer back in the claims to a specific combination with one or more other claims, other examples can also comprise a combination of dependent claims with the subject matter of any other dependent claim or a combination of each feature with other dependent or independent claims. Such combinations shall be encompassed, unless an explanation is given that a specific combination is not intended. Furthermore, the intention is for a combination of features of a claim with any other independent claim also to be encompassed, even if this claim is not directly dependent on the independent claim.

Although specific exemplary embodiments have been illustrated and described herein, it will be apparent to a person skilled in the art that a multiplicity of alternative and/or equivalent implementations can be substituted for the specific exemplary embodiments shown and illustrated there, without departing from the subject matter of the present application. This application text is intended to cover all adaptations and variations of the specific exemplary embodiments discussed and described herein. Therefore, the present subject matter of the application is limited only by the wording of the claims and the equivalent embodiments thereof.

What is claimed is:

1. A moisture sensor comprising:
   a carrier element comprising an insulating material;
   a first and a second electrode structure arranged at a distance from one another at the carrier element;
   a moisture-sensitive, dielectric layer element at a first main surface region of the carrier element and adjacent to the first and second electrode structures; and
   a third electrode structure on a first main surface region of the moisture-sensitive, dielectric layer element, such that the moisture-sensitive, dielectric layer element is arranged between the third electrode structure and the first electrode structure and between the third electrode structure and the second electrode structure,
   wherein the first electrode structure is configured as a first capacitor electrode and the second electrode structure is configured as a second capacitor electrode of a measurement capacitor for capacitive moisture measurement,
   wherein the third electrode structure is configured as a floating electrode structure, and
   wherein the first and second electrode structures are embedded at least regionally in the insulating material of the carrier element, and wherein a first vertical edge of the insulating material is collinear with a vertical edge of the first electrode structure, and wherein a second vertical edge of the insulating material is collinear with a vertical edge of the second electrode structure.

2. The moisture sensor as claimed in claim 1, wherein the floating electrode structure comprises a conductive layer having openings, such that the moisture-sensitive, dielectric layer element is accessible to a surrounding atmosphere through the openings.

3. The moisture sensor as claimed in claim 1, wherein a potential difference is present between the first and second capacitor electrodes of the measurement capacitor, and the floating electrode structure is configured for collecting an electrical leakage field between the first and second electrode structures.

4. The moisture sensor as claimed in claim 1, wherein the floating electrode structure comprises an electrically conductive material.

5. The moisture sensor as claimed in claim 1, wherein the moisture-sensitive, dielectric layer element has a relative permittivity dependent on moisture in a surrounding atmosphere.

6. The moisture sensor as claimed in claim 1, wherein a potential difference is present between the first and second capacitor electrodes of the measurement capacitor, and a capacitance value dependent on moisture in a surrounding atmosphere is able to be read out.

7. The moisture sensor as claimed in claim 1, wherein the moisture-sensitive, dielectric layer element comprises a polyimide material.

8. The moisture sensor as claimed in claim 1, further comprising:
   a first contact connection area, which is connected to the first electrode structure, and a second contact connection area, which is connected to the second electrode structure.

9. The moisture sensor as claimed in claim 1, wherein the moisture-sensitive, dielectric layer element is configured to be effective at least regionally as a capacitor dielectric of the measurement capacitor.

10. A method comprising:
    providing a carrier element comprising an insulating material;
    providing a first and a second electrode structure at a distance from one another at the carrier element;
    providing a moisture-sensitive, dielectric layer element at a first main surface region of the carrier element and adjacent to the first and second electrode structures, and
    providing a third electrode structure on a first main surface region of the moisture-sensitive, dielectric layer element, such that the moisture-sensitive, dielectric layer element is between the third electrode structure and the first electrode structure and between the third electrode structure and the second electrode structure,
    wherein the first electrode structure is configured as a first capacitor electrode and the second electrode structure is configured as a second capacitor electrode of a measurement capacitor for capacitive moisture measurement, and
    wherein the third electrode structure is configured as a floating electrode structure, and
    embedding the first and second electrode structures at least regionally in the insulating material of the carrier element, wherein a first vertical edge of the insulating material is collinear with a vertical edge of the first electrode structure, and wherein a second vertical edge of the insulating material is collinear with a vertical edge of the second electrode structure.

11. The method as claimed in claim 10, wherein the floating electrode structure comprises a conductive layer having openings, such that the moisture-sensitive, dielectric layer element is accessible to a surrounding atmosphere through the openings.

12. The method as claimed in claim 10, wherein a potential difference is present between the first and second capacitor electrodes of the measurement capacitor, and the floating electrode structure is configured for collecting an electrical leakage field between the first and second electrode structures.

13. The method as claimed in claim 10, wherein the floating electrode structure comprises an electrically conductive material.

14. The method as claimed in claim 10, wherein the moisture-sensitive, dielectric layer element has a relative permittivity dependent on moisture in a surrounding atmosphere.

15. The method as claimed in claim 10, wherein a potential difference is present between the first and second capacitor electrodes of the measurement capacitor, and a capacitance value dependent on moisture in a surrounding atmosphere is able to be read out.

16. The method as claimed in claim 10, wherein the moisture-sensitive, dielectric layer element comprises a polyimide material.

17. The method as claimed in claim 10, wherein the moisture-sensitive, dielectric layer element is configured to be effective at least regionally as a capacitor dielectric of the measurement capacitor.

18. A moisture sensor comprising:
- a carrier element comprising an insulating material;
- a first and a second electrode structure arranged at a distance from one another at the carrier element;
- a moisture-sensitive, dielectric layer element at a first main surface region of the carrier element and adjacent to the first and second electrode structures, and
- a third electrode structure on a first main surface region of the moisture-sensitive, dielectric layer element, such that the moisture-sensitive, dielectric layer element is arranged between the third electrode structure and the first electrode structure and between the third electrode structure and the second electrode structure,
- wherein the first electrode structure is configured as a first capacitor electrode and the second electrode structure is configured as a second capacitor electrode of a measurement capacitor for capacitive moisture measurement, and
- wherein the third electrode structure is configured as a web structure, and
- wherein the first and second electrode structures are embedded at least regionally in the insulating material of the carrier element, and wherein a first vertical edge of the insulating material is collinear with a vertical edge of the first electrode structure, and wherein a second vertical edge of the insulating material is collinear with a vertical edge of the second electrode structure.

* * * * *